(12) United States Patent
Ashrafi

(10) Patent No.: US 11,997,500 B2
(45) Date of Patent: *May 28, 2024

(54) SDR-BASED MASSIVE MIMO WITH V-RAN CLOUD ARCHITECTURE AND SDN-BASED NETWORK SLICING

(71) Applicant: NXGEN PARTNERS IP, LLC, Dallas, TX (US)

(72) Inventor: Solyman Ashrafi, Plano, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/953,853

(22) Filed: Sep. 27, 2022

(65) Prior Publication Data

US 2023/0025395 A1    Jan. 26, 2023

Related U.S. Application Data

(63) Continuation of application No. 17/002,213, filed on Aug. 25, 2020, now Pat. No. 11,457,365, which is a
(Continued)

(51) Int. Cl.
| | |
|---|---|
| H04L 12/28 | (2006.01) |
| H04L 41/0806 | (2022.01) |
| H04L 41/0816 | (2022.01) |
| H04L 67/10 | (2022.01) |
| H04W 16/10 | (2009.01) |

(Continued)

(52) U.S. Cl.
CPC ......... *H04W 16/10* (2013.01); *H04L 41/0806* (2013.01); *H04L 41/0816* (2013.01); *H04L 67/10* (2013.01); *H04B 1/0003* (2013.01);

*H04B 7/0452* (2013.01); *H04L 41/0893* (2013.01); *H04L 41/5006* (2013.01); *H04L 63/30* (2013.01)

(58) Field of Classification Search
CPC . H04B 1/0003; H04B 7/0452; H04L 41/0895; H04L 41/40
USPC ................ 370/252, 329, 430, 442
See application file for complete search history.

(56) References Cited

U.S. PATENT DOCUMENTS

| | | |
|---|---|---|
| 9,267,877 B2 | 2/2016 | Ashrafi et al. |
| 9,331,875 B2 | 5/2016 | Ashrafi et al. |
| (Continued) | | |

OTHER PUBLICATIONS

A. Berl, H. de Meer, H. Hlavacs, and T. Treutner; Virtualization in energy-efficient future home environments; IEEE Commun. Mag., vol. 47, No. 12, pp. 62-67; Dec. 11, 2009.
(Continued)

*Primary Examiner* — John Pezzlo

(57) ABSTRACT

A method for controlling data transmission within a telecommunications network involves providing interconnections to both a core network and to at least one user device via a base station. A configurable network is defined interconnecting the at least one core network and the base station. A first network slice is selected responsive to use of the configurable network by a first application. A second network slice is selected responsive to use of the configurable network by a second application. Data transmission are provided between the core network and the base station over the configurable network based on the selected first or second network slice.

11 Claims, 26 Drawing Sheets

Related U.S. Application Data continuation of application No. 16/053,271, filed on Aug. 2, 2018, now Pat. No. 10,757,576, which is a continuation-in-part of application No. 15/954,967, filed on Apr. 17, 2018, now Pat. No. 10,271,217, which is a continuation of application No. 15/664,764, filed on Jul. 31, 2017, now Pat. No. 9,949,133.

(60) Provisional application No. 62/540,335, filed on Aug. 2, 2017, provisional application No. 62/371,279, filed on Aug. 5, 2016.

(51) Int. Cl.
| | | |
|---|---|---|
| H04B 1/00 | (2006.01) | |
| H04B 7/0452 | (2017.01) | |
| H04J 1/16 | (2006.01) | |
| H04L 9/40 | (2022.01) | |
| H04L 41/0893 | (2022.01) | |
| H04L 41/5006 | (2022.01) | |

(56) References Cited

U.S. PATENT DOCUMENTS

| | | |
|---|---|---|
| 9,662,019 B2 | 5/2017 | Ashrafi et al. |
| 9,705,949 B2 | 7/2017 | Cui et al. |
| 9,900,196 B2 | 2/2018 | Mehrabani et al. |
| 10,015,681 B2 | 7/2018 | Agarwal et al. |
| 10,205,655 B2 | 2/2019 | Barzegar et al. |
| 2009/0279490 A1 | 11/2009 | Alcorn |
| 2011/0243553 A1 | 10/2011 | Russell |
| 2011/0285589 A1 | 11/2011 | Bull |
| 2012/0284492 A1 | 11/2012 | Zievers |
| 2012/0303835 A1 | 11/2012 | Kempf et al. |
| 2013/0028073 A1 | 1/2013 | Tatipamula et al. |
| 2013/0165177 A1 | 6/2013 | Berg et al. |
| 2013/0207841 A1 | 8/2013 | Negus et al. |
| 2013/0332359 A1 | 12/2013 | Qteishat |
| 2014/0098815 A1 | 4/2014 | Mishra et al. |
| 2014/0254373 A1 | 9/2014 | Varma |
| 2014/0321282 A1 | 10/2014 | Pragada et al. |
| 2015/0055623 A1 | 2/2015 | Li et al. |
| 2015/0071248 A1 | 3/2015 | Faerber et al. |
| 2015/0181502 A1 | 6/2015 | Hans et al. |
| 2015/0207724 A1 | 7/2015 | Choudhury et al. |
| 2015/0350077 A1 | 12/2015 | Durrani et al. |
| 2016/0029403 A1 | 1/2016 | Roy et al. |
| 2016/0041523 A1 | 2/2016 | Ashrafi et al. |
| 2016/0156513 A1 | 6/2016 | Zhang et al. |
| 2016/0241314 A1 | 8/2016 | Ferrante et al. |
| 2016/0262068 A1 | 9/2016 | Won et al. |
| 2016/0285750 A1 | 9/2016 | Saquib et al. |
| 2016/0302096 A1 | 10/2016 | Chari et al. |
| 2016/0337937 A1 | 11/2016 | McCann et al. |
| 2017/0019811 A1 | 1/2017 | Parulkar |
| 2017/0048290 A1 | 2/2017 | Cui et al. |
| 2017/0054595 A1 | 2/2017 | Zhang et al. |
| 2017/0077979 A1 | 3/2017 | Papa et al. |
| 2017/0079059 A1 | 3/2017 | Li et al. |
| 2017/0099685 A1 | 4/2017 | Wallentin et al. |
| 2017/0111482 A1 | 4/2017 | Mishra et al. |
| 2017/0142226 A1 | 5/2017 | Foy et al. |
| 2017/0229782 A1 | 8/2017 | Adriazola et al. |
| 2017/0245316 A1 | 8/2017 | Salkintzis |
| 2017/0290013 A1 | 10/2017 | McCoy et al. |
| 2017/0290049 A1 | 10/2017 | Reisslein et al. |
| 2017/0318450 A1* | 11/2017 | Salkintzis ............ H04W 48/14 |
| 2017/0331577 A1 | 11/2017 | Parkvall et al. |
| 2017/0331670 A1 | 11/2017 | Parkvall et al. |
| 2017/0332359 A1 | 11/2017 | Tsai et al. |
| 2018/0041934 A1 | 2/2018 | Agarwal et al. |
| 2018/0049064 A1 | 2/2018 | Li et al. |
| 2018/0249346 A1 | 8/2018 | Plestid et al. |
| 2018/0302807 A1 | 10/2018 | Chen et al. |
| 2018/0324605 A1 | 11/2018 | Agarwal et al. |
| 2018/0352498 A1 | 12/2018 | Reisslein et al. |
| 2019/0075512 A1 | 3/2019 | Jin et al. |
| 2019/0158653 A1 | 5/2019 | Sonntag |
| 2019/0261159 A1* | 8/2019 | Wang .................... H04W 76/18 |
| 2020/0169952 A1* | 5/2020 | Wang .................... H04W 76/25 |
| 2020/0177687 A1* | 6/2020 | Kodaypak .......... H04L 41/0806 |
| 2021/0212134 A1 | 7/2021 | Sternberg et al. |

OTHER PUBLICATIONS

A. Gember et al.; Stratos: A network-aware orchestration layer for virtual middleboxes in clouds; [Online]. Available: http://arxiv.org/abs/1305.0209; May 1, 2013.

A. Patro and S. Banerjee; Outsourcing coordination and management of home wireless access points through an open api; Computer Communications (INFOCOM); 2015 IEEE Conference on. IEEE; May 1, 2015.

A. Dixit, F. Hao, S. Mukherjee, T. V. Lakshman, and R. Kompella; Towards an elastic distributed SDN controller; Proc. 2nd ACM SIGCOMM Workshop Hot Topics Softw. Defined Netw .; pp. 7-12; Aug. 16, 2013.

A. Doria et al.; Forwarding and Control Element Separation (ForCES) Protocol Specification; document 5810; Mar. 2010.

A. Doria et al.; General switch management protocol (GSMP) V3; Tech. Rep.; doi: http://dx.doi.org/10.17487/RFC3292; Jun. 2002.

A. Hurtado-Borras, J. Pala-Sole, D. Camps-Mur, and S. Sallent-Ribes; sdn wireless backhauling or small cells; Communications (ICC); 2015 IEEE International Conference; pp. 3897-3902; Jun. 8-12, 2015.

B. Raghavan, M. Casado, T. Koponen, S. Ratnasamy, A. Ghodsi, and S. Shenker; Software-defined Internet architecture: Decoupling archi-tecture from infrastructure; Proc. 11th ACM Workshop Hot Topics Netw., Oct. 29-30, 2012, pp. 43-48.

D. Drutskoy, E. Keller, and J. Rexford; Scalable network virtualization in software-defined networks; IEEE Internet Comput., vol. 17, No. 2, pp. 20-27, Nov. 27, 2012.

D. Joseph and I. Stoica; Modeling middleboxes; IEEE Netw., vol. 22, No. 5, pp. 20-25, Sep. 19, 2008.

D. Katz and D. Ward; Bidirectional Forwarding Detection (BFD). RFC 5880 (Proposed Standard); Jun. 2010; Updated by RFC 7419.

E. D. Zwicky, S. Cooper, and D. B. Chapman; Building Internet Firewalls; Sebastopol, CA, USA: O'Reilly Media, 2000.

F. T. Leighton and D. M. Lewin; Content delivery network using edge-of-network servers for providing content delivery to a set of participating content providers; U.S. Pat. No. 6,553,413, Apr. 22, 2003.

G. Lu et al.; Serverswitch: A programmable and high performance platform for data center networks; Proc. NSDI, vol. 11. Mar. 2011, pp. 1-14.

H. Hawilo, A. Shami, M. Mirahmadi, and R. Asal; NFV: State of the art, challenges, and implementation in next generation mobile net-works (vEPC); IEEE Netw., vol. 28, No. 6, pp. 18-26, Nov./Dec. 2014.

H. Ludwig et al.; Web service level agreement (WSLA) language specification; IBM Corp., New York, NY, USA; Tech. Rep.,; Jan. 2003, pp. 815-824.

J. Case, M. Fedor, M. Schoffstall, and J. Davin; A Simple Network Management Protocol (SNMP); document 1157, May 1990.

J. Martins et al.; ClickOS and the art of network function virtualization; Proc. 11th USENIX Symp. Netw. Syst. Design Implement. (NSDI), Seattle, WA, USA, Apr. 2-4, 2014, pp. 459-473.

K. Phemius and M. Bouet; Monitoring latency with openflow; Network and Service Management (CNSM), 2013; 9th International Conference on. IEEE; Oct. 2013.

Kari Seppanen, Jorma Kilpi, and Tapio Suihko; Integrating wmn based mobile backhaul with sdn control; Mob.Netw. Appl., 20(1):32-39; Oct. 29, 2014.

N. Handigol, S. Seetharaman, M. Flajslik, N. McKeown, and R. Johari; Plug-n-serve: Load-balancing Web traffic using OpenFlow; Proc. ACM SIGCOMM Demo, Aug. 2009, pp. 1-2.

N. McKeown et al.; OpenFlow: Enabling innovation in campus networks; ACM SIGCOMM Comput. Commun. Rev., vol. 38, No. 2, pp. 69-74, 2008.

(56) References Cited

OTHER PUBLICATIONS

N.L.M. van Adrichem, B.J. Van Asten, and F.A. Kuipers; Fast recovery in software-defined networks; Software Defined Networks (EWSDN), 2014 Third European Workshop; pp. 61-66; Sep. 2014.
Open Networking Foundation; Openflow switch specification; Version 1.1.0 implemented (wire protocol 0x02); Dec. 31, 2009.
P. Sun, M. Yu, M. J. Freedman, J. Rexford, and D. Walker; Hone: Joint host-network traffic management in software-defined networks; Journal of Network and Systems Management, vol. 23, No. 2; Apr. 2014.
P. Dely, A. Kassler, and N. Bayer; Openflow for wireless mesh networks; Computer Communications and Networks (ICCCN), 2011; Proceedings of 20th International Conference; Jul. 2011.
P. Quinn and T. Nadeau; Service Function Chaining Problem Statement; document draft-quinn-sfc-problem-statement-02, Apr. 2015.
R. Bifulco, R. Canonico, M. Brunner, p. Hasselmeyer, and F. Mir, A practical experience in designing an OpenFlow controller; Proc. IEEE Eur. Workshop Softw. Defined Netw. (EWSDN), Oct. 2012, pp. 61-66.
R. Mortier et al.; Control and understanding: Owning your home net-work; Proc. IEEE 4th Int. Conf. Commun. Syst. Netw. (COMSNETS), Jan. 2012, pp. 1-10.
S. Ashrafi, et al, "Detecting and Disentangling Nonlinear Structure from Solar Flux Time Series," Conference Paper (National Aeronautics and Space Administration, 1993).
S. Ashrafi, et al, "Nonlinear Techniques for Forecasting Solar Activity Directly From its Time Series," Technical Report (National Aeronautics and Space Administration, 1992).
S. Ashrafi, et al, "PCS System Design Issues in the Presence of Microwave OFS," Electromagnetic Wave Interaction: Series on Stability, Vibration and Control of Systems: vol. 12 (1996).
S. Ashrafi, et al, "Solar Flux Forecasting Using Mutual Information with an Optimal Delay," Conference Paper (National Aeronautics and Space Administration, 1993).
S. Ashrafi, et al, "Combining Schatten's Solar Activity Prediction Model with a Chaotic Prediction Model," Technical Report (National Aeronautics and Space Administration, 1991).
S. Ashrafi, et al, "Demonstration of Distance Emulation for an Orbital-Angular-Momentum Beam," OSA Technical Digest (Optical Society of America, 2015).
S. Ashrafi, et al, "Experimental Demonstration of a 400-Gbit/s Free Space Optical Link Using Multiple Orbital-Angular-Momentum Beams with Higher Order Radial Indices," OSA Technical Digest (Optical Society of America, 2015).=.
S. Ashrafi, et al, "Experimental Demonstration of Two-Mode 16-Gbit/s Free-Space mm-Wave Communications Link Using Thin Metamaterial Plates to Generate Orbital Angular Momentum Beams," (The Institute of Electrical and Electronics Engineers, 2015).
S. Ashrafi, et al, "Free-Space Optical Communications Using Orbital-Angular-Momentum Multiplexing Combined with MIMO-Based Spatial Multiplexing," OSA Technical Digest (Optical Society of America, 2015).
S. Ashrafi, et al, "Future Mission Studies: Forecasting Solar Flux Directly from its Chaotic Time Series," Technical Report (National Aeronautics and Space Administration, 1991).
S. Ashrafi, et al, "Future Mission Studies: Preliminary Comparisons of Solar Flux Models," Technical Report (National Aeronautics and Space Administration, 1991).
S. Ashrafi, et al, "Performance Enhancement of an Orbital-Angular-Momentum-Based Free-Space Optical Communication Link Through Beam Divergence Controlling," OSA Technical Digest (Optical Society of America, 2015).
S. Ashrafi, et al. "400-Gbit/s Free Space Optical Communications Link Over 120-meter Using Multiplexing of 4 Collocated Orbital-Angular-Momentum Beams," OSA Technical Digest (Optical Society of America, 2015).
S. Ashrafi, et al. "Channeling Radiation of Electrons in Crystal Lattices," Essays on Classical and Quantum Dynamics, Chap. 12 (1991).
S. Ashrafi, et al. "Enhanced Spectral Efficiency of 2.36 bits/s/Hz using Multiple Layer Overlay Modulation for QPSK over a 14-km Single Mode Fiber Link," OSA Technical Digest (Optical Society of America, 2015).
S. Ashrafi, et al. "Optical communications using orbital angular momentum beams," Advances in Optics and Photonics vol. 7 (Optical Society of America, 2015).
S. Ashrafi, et al. "Performance Metrics and Design Considerations for a Free-Space Optical Orbital-Angular-Momentum-Multiplexed Communication Link, " Optics Letters vol. 40 (Optical Society of America, 2015).
S. Ashrafi, et al. "Splitting and Contrary Motion of Coherent Bremsstrahlung Peaks in Strained-Layer Superlattices," (Optical Society of America, 1991).
S. Ashrafi, et al. "Splitting of Channeling-Radiation Peaks in Strained-Layer Superlattices," Journal vol. 8 (Optical Society of America, 1991).
S. Ashrafi, et al. "Spurious Resonances and Modelling of Composite Resonators," (The Institute of Electrical and Electronics Engineers, 1983).
S. Ashrafi, et al. "Demonstration of an Obstruction-Tolerant Millimeter-Wave Free-Space Communications Link of Two 1-Gbaud 16-QAM Channels using Bessel Beams Containing Orbital Angular Momentum," (Society of Photo-optical Instrumentation Engineers, 2015).
S. Ashrafi, et al. "Evidence of Chaotic Pattern in Solar Flux Through a Reproducible Sequence of Period-Doubling-Type Bifurcations," Technical Report (National Aeronautics and Space Administration, 1991).
S. Ashrafi, et al. "Experimental Measurements of Multipath-Induced Intra- and Inter-Channel Crosstalk Effects in a Millimeter-Wave Communications Link using Orbital-Angular-Momentum Multiplexing," (The Institute of Electrical and Electronics Engineers, 2015).
S. Ashrafi, et al. "Lyapunov Exponent of Solar Flux Time Series," (Proceedings of First Experimental Chaos Conference, 1991).
S. Ashrafi, et al. "Acoustically Induced Stresses in Elastic Cylinders and their Visualization," (Acoustical Society of America, 1987).
T. Wu, L. Rui, A. Xiong, and S. Guo; An automation PCI allocation method for eNodeB and home eNodeB cell; Proc. IEEE 6th Int. Conf. Wireless Commun. Netw. Mobile Comput. (WiCOM); Sep. 2010, pp. 1-4.
Y. Li, M. Chen; Software-Defined Network Function Virtualization: A Survey; IEEE 2015, pp. 2169-3536.

* cited by examiner

SDR-BASED MASSIVE MIMO WITH V-RAN CLOUD ARCHITECTURE AND SDN-BASED NETWORK SLICING

CROSS-REFERENCE TO RELATED APPLICATIONS

This application is a continuation of U.S. patent application Ser. No. 17/002,213, filed Aug. 25, 2020, entitled SDR-BASED MASSIVE MIMO WITH V-RAN CLOUD ARCHITECTURE AND SDN-BASED NETWORK SLICING, issued as U.S. Pat. No. 11,457,365 on Sep. 27, 2022. U.S. patent application Ser. No. 17/002,213 is a continuation of U.S. patent application Ser. No. 16/053,271, filed Aug. 2, 2018, entitled SDR-BASED MASSIVE MIMO WITH V-RAN CLOUD ARCHITECTURE AND SDN-BASED NETWORK SLICING, now U.S. Pat. No. 10,757,576, issued on Aug. 25, 2020, which claims the benefit of U.S. Provisional Application No. 62/540,335, filed Aug. 2, 2017 and entitled SDR-BASED MASSIVE MIMO WITH V-RAN CLOUD ARCHITECTURE AND SDN-BASED NETWORK SLICING, the specification of which is incorporated herein by reference in its entirety. U.S. patent application Ser. No. 16/053,271 is a Continuation-in-Part of U.S. patent application Ser. No. 15/954,967 filed Apr. 17, 2018 and entitled ULTRA-BROADBAND VIRTUALIZED TELECOM AND INTERNET, now U.S. Pat. No. 10,271,217 issued on Apr. 23, 2019, which is a continuation of U.S. patent application Ser. No. 15/664,764, filed Jul. 31, 2017 and entitled ULTRA-BROADBAND VIRTUALIZED TELECOM AND INTERNET, now U.S. Pat. No. 9,949,133 issued Apr. 17, 2018, which claims the benefit of U.S. Provisional Application No. 62/371,279, filed Aug. 5, 2016 and entitled ULTRA-BROADBAND VIRTUALIZED TELECOM AND INTERNET, each of which is incorporated herein by reference in their entirety.

TECHNICAL FIELD

The present invention relates to a system and method for providing flexible network configurations, and more particularly, to a system and method for providing flexible network configurations using logically independent network slicing and data center based cloud architecture to support various applications and services.

BACKGROUND

Telecommunication network were originally configured to provide voice communications services from one mobile user to another. The development of smart devices such as smart phones, mobile computing using tablets and laptop computers and the increased reliance of everyday devices on a stable Internet connection have drastically changed the nature of traffic on telecommunications networks from primarily voice-based communications to data transmission based communications. Currently, the various services and applications provided to users over data communications services come from data centers that are normally very closely located with the network core rather than with the radio transmission units on the network edge. For many applications that have significant latency considerations this can have an adverse effect on the quality of experience of a user. Additionally, the variations in the requirements of various application services which may be used over the network do not lend themselves well a network configuration that is implemented to support worst-case scenarios. This will cause the network to provide optimal support for conditions occurring only in a limited number of situations. The remainder of the time, the network will be essentially over configured for less network intensive functionalities.

Thus, there is a need for network that has the ability to overcome all of these issues. The ability to dynamically change network configuration based upon the particular application or service being used, the ability to move data center functionalities from the network core toward the network edge and the ability to improve backhaul network performance by configuring the backhaul network to better provide for data transmission rather than voice transmission. A network addressing these issues arising in the modern-day data intensive communication environment would be of great benefit to both network providers and network users.

SUMMARY

The present invention, as disclosed and described herein, in one aspect thereof, comprises a method for controlling data transmission within a telecommunications network involves providing interconnections to both a core network and to at least one user device via a base station. A configurable network is defined interconnecting the at least one core network and the base station. A first network slice is selected responsive to use of the configurable network by a first application. A second network slice is selected responsive to use of the configurable network by a second application. Data transmission are provided between the core network and the base station over the configurable network based on the selected first or second network slice.

BRIEF DESCRIPTION OF THE DRAWINGS

For a more complete understanding, reference is now made to the following description taken in conjunction with the accompanying Drawings in which.

DETAILED DESCRIPTION

Figure 1:
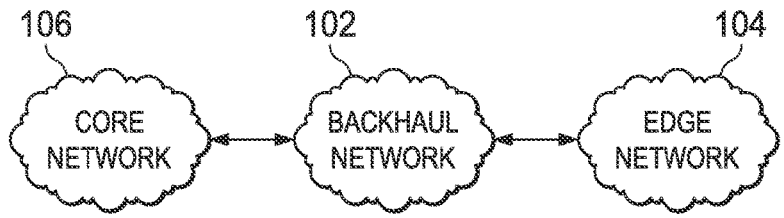
FIG. 1 illustrates the manner in which a backhaul network interconnects an edge network and a core network.

Referring now to the drawings, wherein like reference numbers are used herein to designate like elements throughout, the various views and embodiments of SDR-based massive MIMO with V-RAN cloud architecture and SDN-based network slicing are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated the manner in which a backhaul network 102 is used for interconnecting an edge network 104 with a core network 106. In a hierarchical network the backhaul network 102 comprises the intermediate links between the core network 106 (backbone network) and the small subnetworks at the edge of the entire hierarchical network. The backhaul network 102 carries packets/data to and from the core network 106. For example, in a telecommunications network cell phones communicating with a cell tower constitute a local subnetwork. The connection between the cell tower and the rest of the world begins with a backhaul links to the core of the Internet service provider network. Backhaul networks 102 may be used to describe the entire wired part of the network, although some networks have wireless instead of wired backhaul, in whole or in part, for example using microwave bands, mesh networks and edge network topologies. The backhaul network 102 may use high-capacity wireless channels to get packets to the microwave or fiber links.

Backhaul networks 102 may use a variety of technologies. The choice of backhaul technology must take into account parameters such as capacity, cost, reach and the need for such resources as frequency spectrum, optical fiber, wiring or rights-of-way. Generally, backhaul solutions can largely be categorized into wired (leased lines or copper/fiber) or wireless (point-to-point, point to multipoint over high-capacity radio links). Wired solutions are usually very expensive and often impossible to deploy in remote areas. This makes wireless a more suitable and/or viable option. Multi-hop wireless architecture can overcome the hurdles of wired solutions by creating efficient large coverage areas with growing demand in emerging markets where cost is often a major factor in deciding technologies. Wireless backhaul solutions are able to offer carrier grade services which are not easily feasible with wired backhaul connectivity. Backhaul technologies include free space optics, point-to-point microwave radio relay transmission (terrestrial or by satellite), point to multipoint microwave access technologies, such as LMDS, Wi-Fi, WiMAX, DSL variants such as ADSL and SHDSL, PDH and SDH Lasse Esso and ET interfaces, such as (fractional) E1/T1, E3, T3, STM-1/OC-3, etc. and ethernet. The system such as that more fully herein below may also be used within the systems such as that described in U.S. patent application Ser. No. 14/882,085 entitled APPLICATION OF ORBITAL ANGULAR MOMENTUM TO FIBER, FSO AND RF filed on Oct. 15, 2015, which published as U.S. Patent Publication No. US 2016-0127073 A1 on May 5, 2016, which is incorporated herein by reference in its entirety, to transmit information.

In addition to the plane wave embodiments that are disclosed in the described system for SDN-based channel estimation for multiplexing between LOS mmWaves, NLOS sub-6 GHz and FSO described herein, a system for implementing the twisted waves generated by the application of orthogonal functions to a plane wave may also be utilized. For example, the various embodiments disclosed in U.S. patent application Ser. No. 15/216,474 entitled SYSTEM AND METHOD FOR COMBINING MIMO AND MODE-DIVISION MULTIPLEXING filed on Jul. 21, 2016, now U.S. Pat. No. 9,998,187 issued Jun. 12, 2018, and U.S. patent application Ser. No. 15/144,297 entitled SYSTEM AND METHOD FOR COMMUNICATION USING ORBITAL ANGULAR MOMENTUM WITH MULTIPLE LAYER OVERLAY MODULATION filed on May 2, 2016, now U.S. Pat. No. 9,503,258 issued Nov. 22, 2016, each of which is incorporated herein by reference in their entirety, may be used.

Hybrid (Heterogeneous) networks consist of networks including devices wherein the components providing the transmission of data are all the same but may each be configured using the included operating software to provide different types of transmissions including but not limited to point-to-point (P2P); point-to-multipoint (P2MP); multi-point-to-multipoint (MP2MP); etc. The described system supports complex heterogeneous networks (HetNet) incorporating multiple services, standards and sites.

Architecture relates to the various system layers and their application to the system from the application layer to the hardware layer such as that described in U.S. Nonprovisional application Ser. No. 15/664,764, filed on Jul. 31, 2017, and entitled ULTRA-BROADBAND VIRTUALIZED TELECOM AND INTERNET, now U.S. Pat. No. 9,949,133 issued Apr. 17, 2018, which is incorporated herein by reference.

Multiband as used herein relates to licensed and unlicensed bands as established in FCC regulations. Licensed bands include, but are not limited to, 24 GHz, 30 GHz, 28 GHz and sub-6 GHz. Unlicensed bands include, but are not limited to, U bands (60 GHz), E bands (71-76 GHz, 81-86 GHz) and WiFi.

Topology for systems implementing the described components may configure the nodes in a tree topology or a ring topology. The tree topology comprises a number of nodes interconnected in a tree structure beginning with a single node that expands to multiple second nodes and each of the second nodes expanding to further multiple third nodes or the single node interconnected to each of the other nodes of a network. Each of the other nodes communicates through the single central node. A ring topology includes a ring connection of all nodes with each node connected only to two adjacent nodes.

A multilayer backhaul network provides for communications using each of copper wire, fiber and RF transmissions. RF may use line of sight and non-line of sight transmissions. Copper may comprise vector bundled (VDSL2) and other types of transmissions. Fiber may use GPON or other types of transmissions.

When providing a variety of services over a fronthaul and/or backhaul network the backhaul network can become overburden causing it to become clogged with traffic and have greatly increased latency. Existing mobile and data networks can provide business-to-client (B2C) services such as commerce, music downloads, video streaming, gaming or social media access. The networks can also provide business-to-business (B2B) services such as IT services, finance, compliance, sales and marketing and customer services. These services are provided over fronthaul and backhaul networks using wired and wireless connections. If a large volume of voice or data services are being used at any particular time, the backhaul network can be overburdened and provide unacceptable services to the customers due to increased latency and delay.

Operators of the backhaul network face a number of challenges. These include declining margins due to the increased demand for video and cloud services creating an explosion of carried traffic. Average revenue per user does not increase linearly with carried traffic thus resulting in declining margins. Additionally, reductions in core equipment cost do not follow Moore's law. Network heterogeneity requires multiple specialized solutions/teams. Automation for configuration and provisioning of network resources increase the network costs. Additional network problems for network providers arise from the low return on investment due to the fact that networks are built for peak usage times and are over provisioned most of the time. Additionally, the current mode of operation for network providers results in slow service innovations due to the lack of network automation and service integration that results in long provisioning delays. The infrastructure is built using closed proprietary boxes. This results in inefficient utilization of radio resources, the inability to provide customization, a slowing in the creation of innovative services and the inability to support industry specific Internet of things scenarios. Thus, there is a need for an architecture for providing a backhaul network that provides more flexibility and enables better use of new protocols such as 5G.

Figure 2:
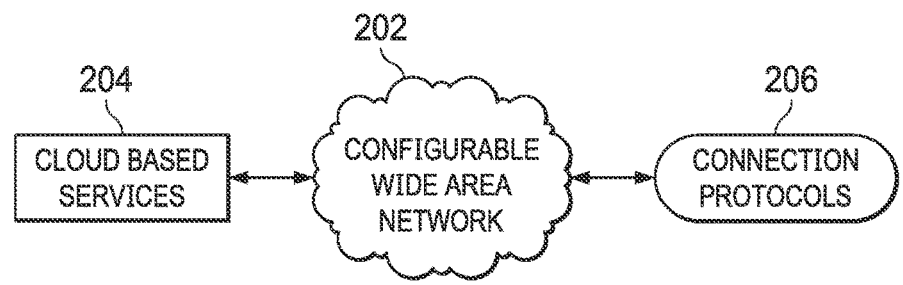
FIG. 2 illustrates a backhaul network set up as a configurable wide area network.

In order to provide a more flexible network, a backhaul network may be set up as a configurable wide area network 202 as illustrated in FIG. 2. The configurable wide area network 202 provides a bridge between cloud-based services 204 and various connection protocols 206. The configurable wide area network 202 provides a number of benefits including economies of scale that provides an infrastructure built with a few commodity building blocks using Open-Source SDN/NFV software and white boxes and providing agility through software platforms that enable the rapid creation of new services. This provides an UltraBroadband on demand network on both RF and fiber that uses virtual radio access network (VRAN), mobile edge computing (MEC), caching of content at the edge of the network and APIs. The system would also use CORD (central office rearchitected as a data center) since it is cloud native. The system will provide SDR based massive MIMO that is used in combination with SDN based network slicing and SDN based fronthaul and backhaul networks on the network architecture.

Figure 3A:
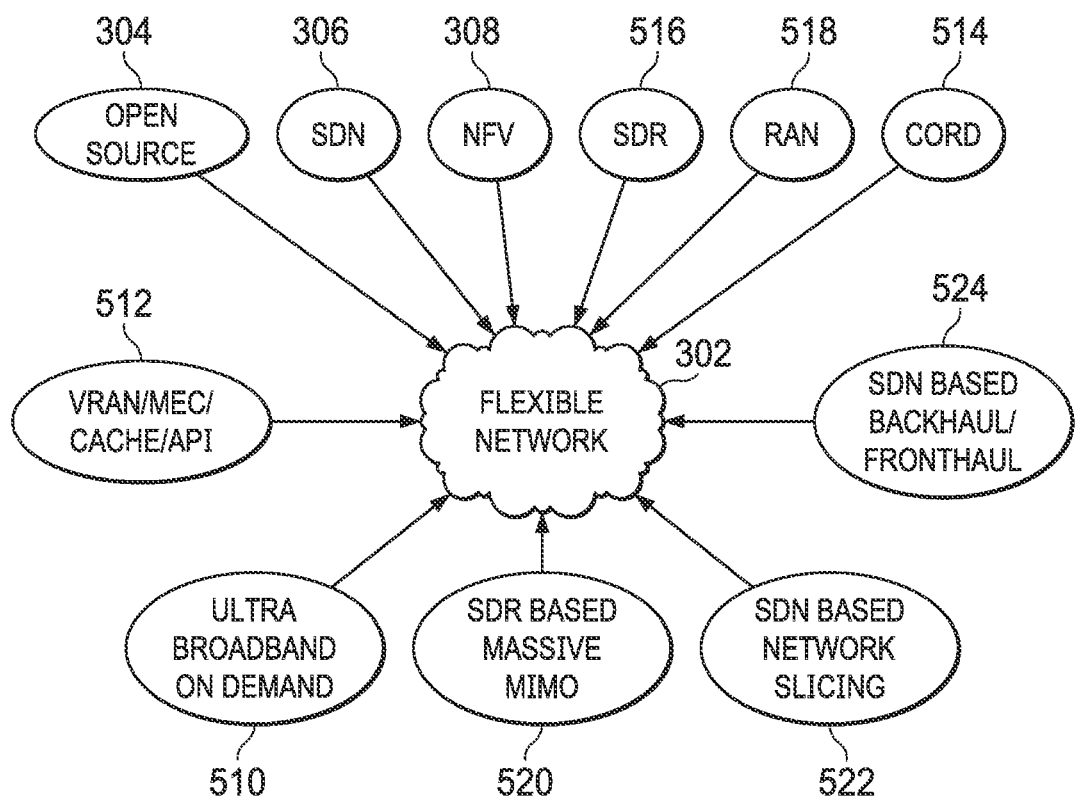
FIG. 3A illustrates factors in a flexible network.

Referring now to FIG. 3A, there is illustrated the manner in which a flexible network 302 may be provided using a combination of factors that may vary and be optimized depending upon the particular application or uses to which the network is being put. OpenSource software 304 may be used may be used for developing a software defined network (SDN) 306 using network function virtualization (NFV) 308. The open source designed SDN/NFV network may provide a number of network capabilities such as ultra-broadband on demand 310 over both RF and optical fiber. This enables access of broadband content on demand through downstream services at greater than 100 Mb/s over a fixed connection (fiber, copper, coax). The open-source SDN/NFV approach also enables implementation of a combination of VRAN/MEC/Cache/API 312 (virtual random-access radio/mobile edge computing/Cache/application program interface) in an easily variable fashion to provide different network capabilities. The open-source SDN/NFV approach also enables the provision of CORD (central office re-architected as a data center) 314. A software defined network 306 may be used to provide SDN-based front haul and backhaul network configurations 324.

The flexible network 302 also has the ability to provide a software defined radio (SDR) functionality 316 and radio access network capabilities (RAN) 318. The software defined radio functionalities 316 may provide SDR based massive MIMO capabilities 322 enable configurable massive MIMO transmissions from transmission units. The SDN capabilities 306 coupled with the SDR capabilities 316 enable the provision of SDN based network slicing 320 with massive MIMO 322 that may uniquely configure the network and radio based upon the particular application or use.

Figure 3B:
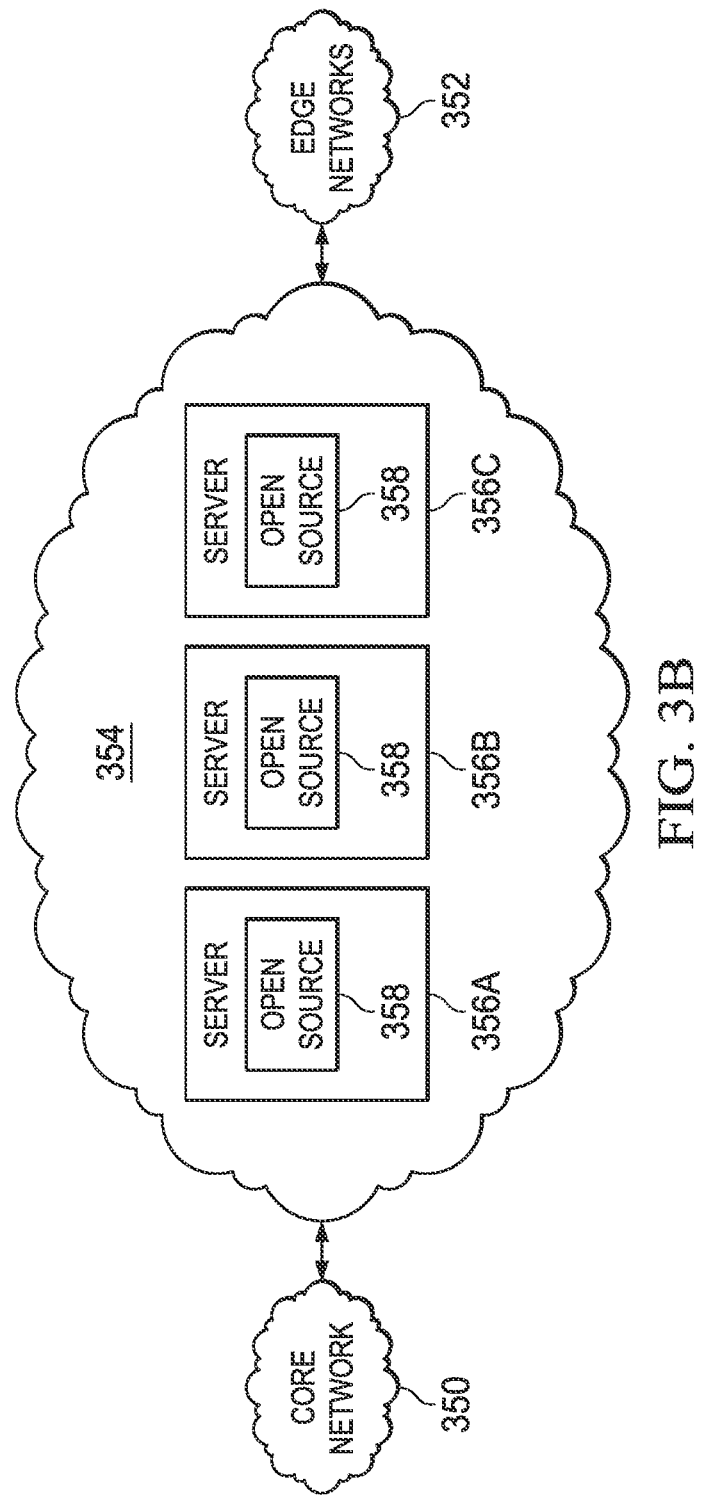
FIG. 3B illustrates the manner for implementing a flexible network using commodity servers implementing Open-Source software.

Referring now to FIG. 3B, there is illustrated the manner in which the flexible network 302 of FIG. 3A would be implemented. The core network 350 and various edge networks 352 are interconnected by the flexible network 354. The flexible network 354 is implemented using a variety of servers 356 that may be located at any number of locations within the flexible network 354. A server 356A may be located close to the core network to implement various applications using Open-Source 358 that do not have latency issues that arise in their operation. On the other hand, server 356C can be implemented close to the edge network 352 or radio transmission units for the implementation of applications have very stringent latency requirements. Additionally, applications can be implemented on servers 356B using Open-Source 358 at a more centralized location for applications that don't have any particular limitations imposed by their position within the flexible network 354. The servers 356 may comprise various types of commodity servers that can implement a variety of functionalities and applications there in using the Open-Source software 358. Hereinbelow, the various components and functionalities that may be implemented on a server 356 using Open-Source software 358 will be more fully described. While the illustration of FIG. 3B shows the servers 356 located at separate locations within the flexible network 354, it will also be appreciated that the servers 356 can be located at a single centralized location at any particular position within the flexible network 354 depending upon network needs.

The RAN 318 provides a number of capabilities within the flexible network 302. The ability to alter optimization targets within the RAN provides for a shift to quality of experience (QoE) of the user. The radio access network 318 may provide for real-time testing and monitoring of the RAN and its associated links. The more particularized implementation of these various configurations and components are more particularly described herein below. By measuring various performance parameters within the RAN 318 shifts to new key performance indicators (KPIs) may be measured and tracked by the RAN. The use of small cells, unlicensed bands and C-RAN (cloud-RAN) provides for a shift to massive MIMO transmissions from the transceivers. C-RAN is a centralized, cloud computing-based architecture for radio access networks that supports various communication standards for centralization of the base station functionalities. The radio access network 518 may deal with increased complexities by shifting to automated processes for implementation of various network functionalities. The radio access network may improve the spectral efficiency by moving to a higher utilization of available resources to improve spectral efficiency. The radio access network 518 must also have the ability to shift from a voice network to a data centric network in view of the developing user market that has become more data-centric and less voice-centric. The radio access network 518 must also shift from a distributed to a more centralized processing system in order to shift the radio access network functionalities closer to the system core. Finally, the radio access network 58 teen must be able to deal with the increased traffic requirements caused by a shift of users to an Internet-of-things functionality. A more detailed discussion of the various implementations of the various components and functionalities of the flexible network 302 are more particularly described herein below.

Figure 4:
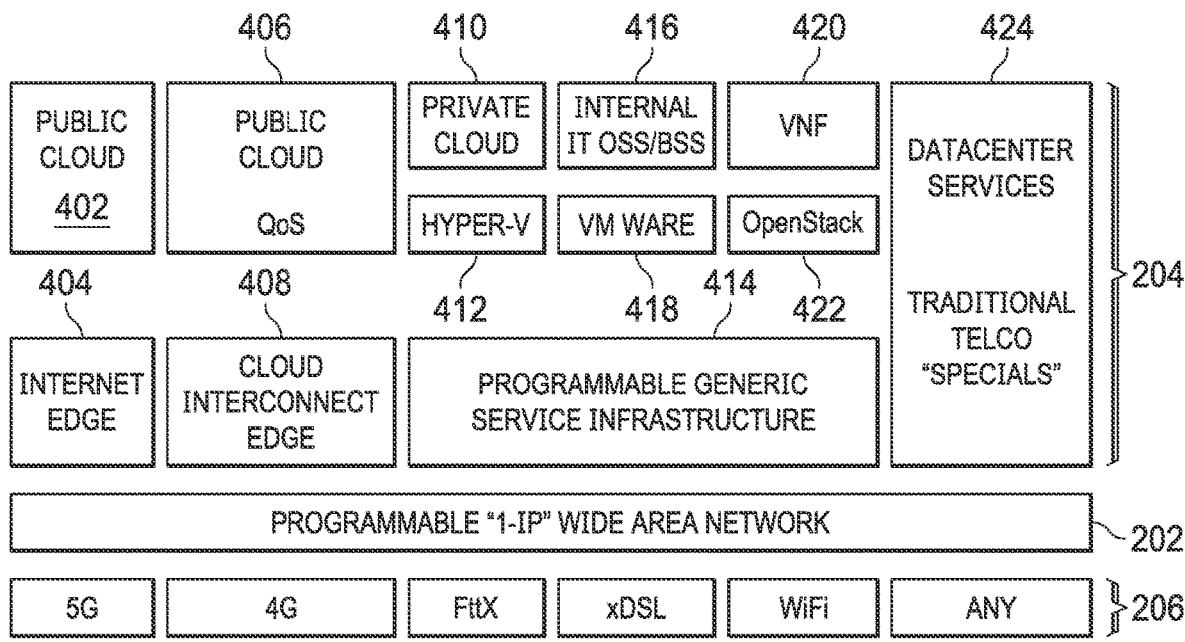
FIG. 4 illustrates one manner for implementation of the configurable network.

FIG. 4 illustrates an embodiment of a configurable wide area network. The configurable/programmable wide area network 202 varies its utilized resources based upon the particular applications or services that are being utilized. The various cloud-based services 204 include the public cloud 402 which interconnects to the wide area network 202 through an Internet Edge 404. Internet Edge 404 is a data network to cell phones. A public cloud 406 requiring a particular quality of service may utilize the cloud interconnect edge 408. The cloud interconnect edge 408 is an optimized network that ensures accelerated access to applications hosted in public, private and hybrid clouds.

A private cloud 410 may connect to the wide area network 202 through Hyper-V 412 and a programmable generic service infrastructure 414. Hyper-V 312 is a native hypervisor that creates virtual machines on systems running Windows. It acts as a hardware virtualization component for the client editions of Windows NT server computer running Hyper-V 312 can be configured to expose individual virtual machines to one or more networks. The programmable generic service infrastructure 414 comprises a generic hardware component program to provide a particular service infrastructure. An Internet IT OSS/BSS 416 communicates through VM hardware 418 and the programmable generic service infrastructure 414 with the programmable wide area network 202. The VMware 418 comprises virtualization and cloud computing software. Virtual network functions (VNF) 420 interact with the network 202 through OpenStack 422 and the programmable generic service infrastructure 414. OpenStack 422 is a set of software tools for building and managing a cloud computing platform for public and private clouds. Finally, data center services 424 may provide data services through the wide area network 202 using traditional Telco "specials."

Figure 5:
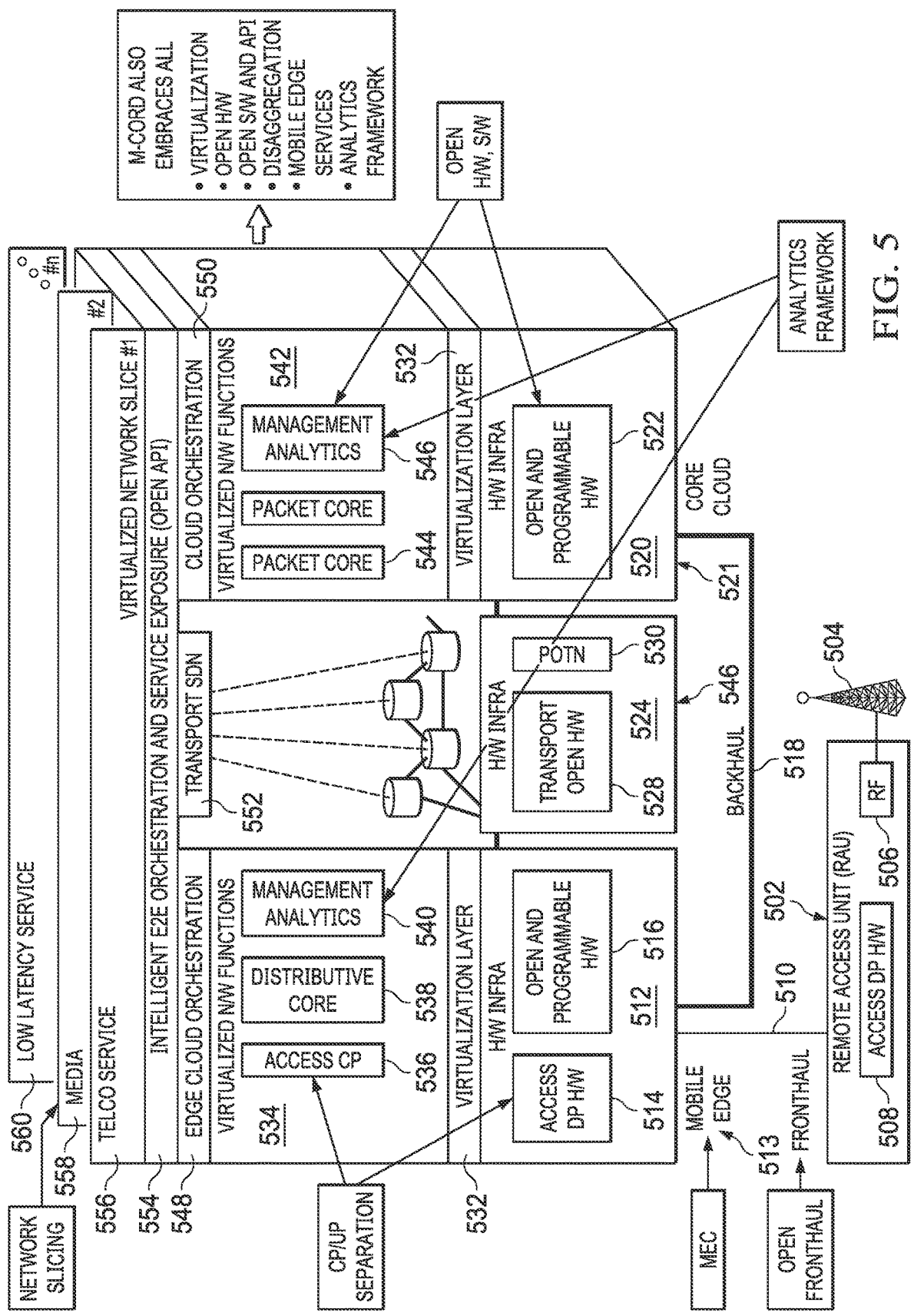
FIG. 5 illustrates a functional block diagram of a system implementing a configurable wide area network.

Referring now to FIG. 5, there is illustrated a functional block diagram of a system implementing the configurable wide area network operating in the manner described hereinabove. A radio access unit (RAU) 502 communicates with a radio antenna 504. The radio access unit 502 includes RF circuitry 506 for communicating with the radio tower and access DP hardware 508 for communicating over the fronthaul 510. A hardware infrastructure 512 associated with the mobile edge 513 includes access DP hardware 514 for communicating with the radio access unit 502. The hardware infrastructure 512 further includes open and programmable hardware 516 for providing a backhaul communications link 518 with additional hardware infrastructure 520 associated with the network core 521. The hardware infrastructure 520 associated with the network core 521 includes open and programmable hardware 522 enabling communications over the backhaul 518. Additional hardware infrastructure 524 is utilized for a transport layer 526. The hardware infrastructure 524 includes transport open hardware 528 and a POTN (packet optical transport network) 530.

Each of the mobile edge network 513 and core cloud network 521 include a virtualization layer 532 on top of the hardware infrastructures 512, 520, respectively. On top of the virtualization layer 532 associated with the mobile edge network 513, a number of virtualized network functions 534 reside. These virtualized network functions 534 include access CP functions 536, distributive core functions 538 and management analytics 540. Another group of virtualized network functions 542 exist upon the virtualization layer 532 within the core cloud network 521. These functions include packet core functions 544 and management analytics 546.

On top of the virtualized network functions 534, edge cloud orchestration functionalities 548 are implemented within the core cloud network 521. Cloud orchestration functionalities 550 are implemented on top of the virtualized network functions 542. Additionally, within the transport layer 526, a transport software defined network 552 enables control of transport between the mobile edge 513 and core cloud 521. The use of software defined networks will be more fully discussed herein below.

On top of each of the orchestration and SDN layers is an intelligent E2E (end-to-end) orchestration and service exposure (open API) 554. Through this open API 554, the virtualized network slices 556-560 may be utilized to implement only those network functionalities that are necessary to carry out particular applications using specific hardware resources. Examples of these type of network slices include Telco (telecommunication) services 556; media services 558, such as various types of video streaming; and various types of low latency services 560 that do not require a high latency level in order to perform their functionalities. Each of the slices 556-560 would only utilize as much of the network services within the mobile edge 513, core cloud 521 and transport layer 526 in order to achieve the operations virtualized by each network slice.

Figure 6:
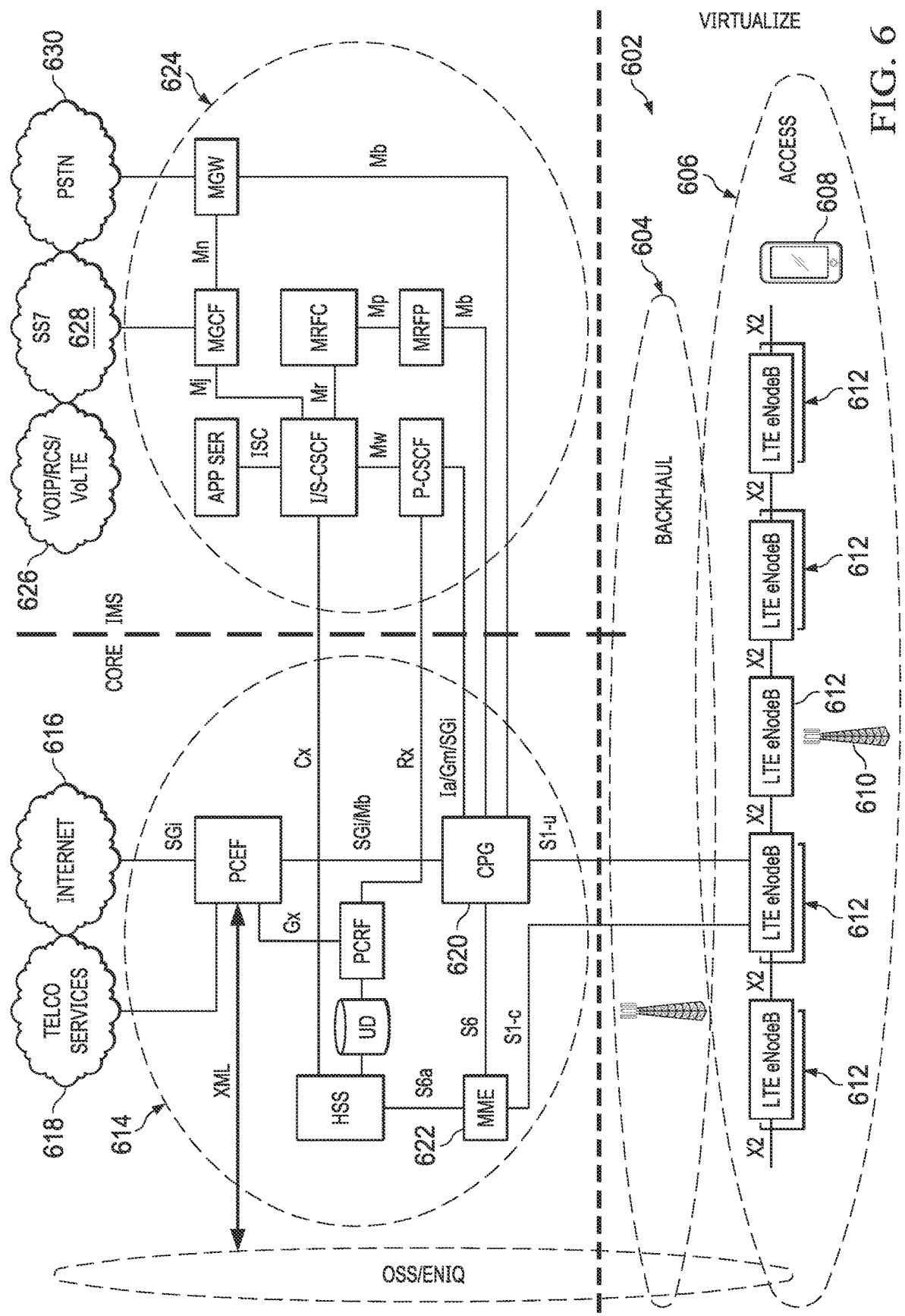
FIG. 6 illustrates a virtualized base station and backhaul network.

Referring now to FIG. 6, there is more particularly illustrated the virtualized base station 1006 and backhaul 816 portions of the networks. The virtualized portion 602 consists of the backhaul network 604 and the access network 606. The access network 606 enables a user device 608 to communicate with an antenna 610 via an RF link. The antennas 610 communicate with various LTE eNodeBs 612. The various LTE eNodeBs 612 and backhaul network 604 are implemented in software using, for example, software defined networking (SDN) and network function virtualization (NFV) as will be more fully described herein below. The virtualized backhaul network 604 communicates with the core network 614 through a converged packet gateway (CPG) 620 and a mobility management entity (MME) 622 to provide access to the Internet 616 and telco services 618. The core network 614 provides access to the Internet multimedia subset (IMS) 624 to provide access to VOIP/RCS/VoLTE 626, SS7 network 628 and the public switched telephone network (PSTN) 1630.

Figure 7:
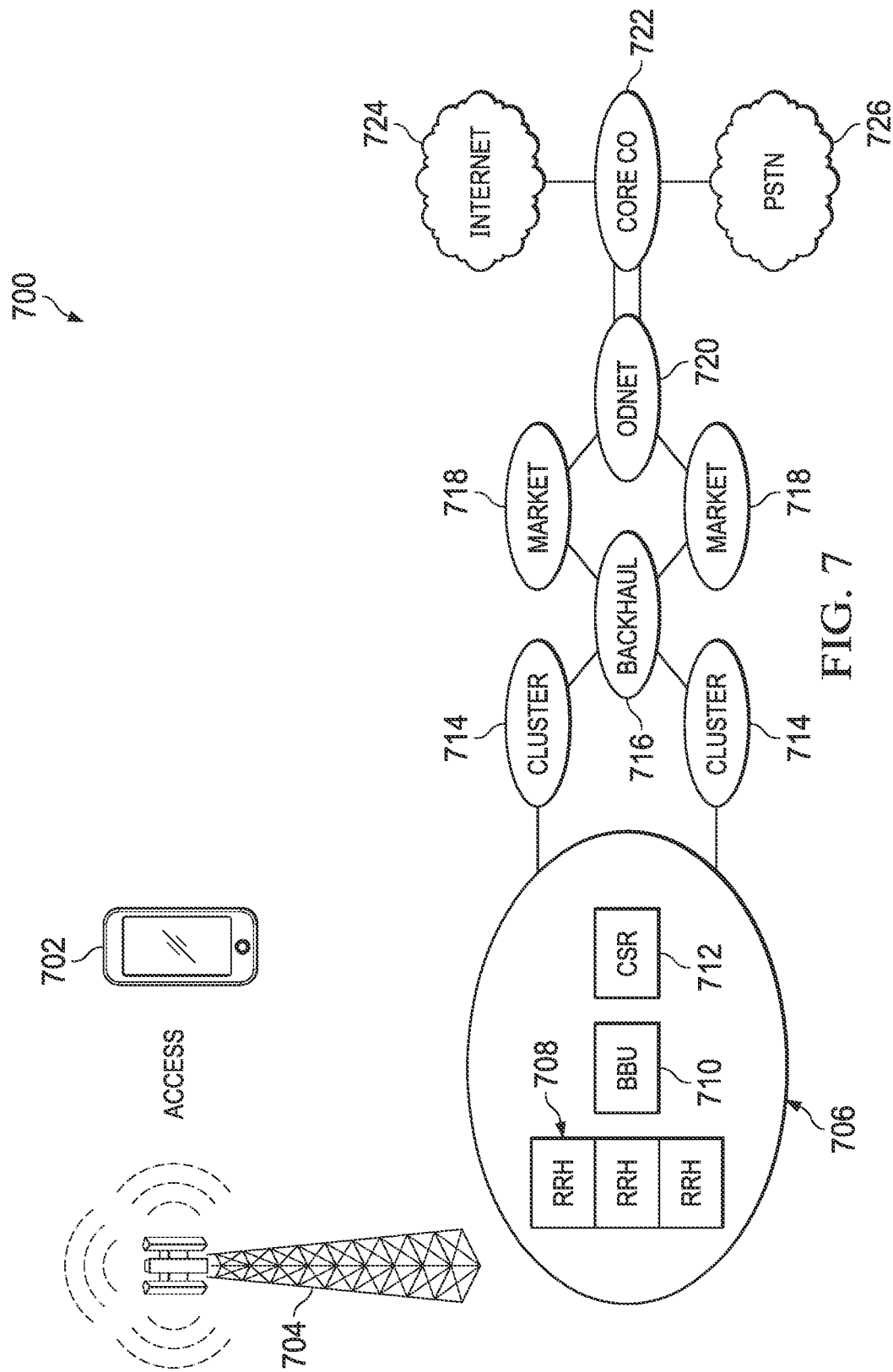
FIG. 7 illustrates a traditional network configuration.

Referring now to FIG. 7, there is illustrated a traditional network configuration. A user device 702 establishes a wire connection with an antenna 704 of the radio access network. Antenna 704 communicates with the base station 706. The base station 706 includes a number of remote radio heads (RRHs) 708. The RRHs 708 contains the base stations RF circuitry plus analog-to-digital/digital-to-analog converters and up/down converters. RRHs 708 have operation and management processing capabilities and a standardized optical interface to connect to the remainder of the base station 706. The baseband unit (BBU) 710 processes baseband within the radio link for signals to/from the RRH 708. The channel state report (CSR) 712 generates channel state information for the communications link. The base station 706 is associated with other base stations within a cluster 714. The cluster 714 comprises a cluster of cells.

The base station 706 communications are transmitted from the various clusters 714 over a backhaul network 716. The backhaul network 716 connects to various markets 718 (particular areas having cell networks) to the optical data network (ODNET) 720. The optical data network 720 connects to the core central office 722. The core central office 722 communicates with the Internet 724 or public switched telephone network (PSTN) 726 in order to download data information or provide voice communications.

Figure 8:
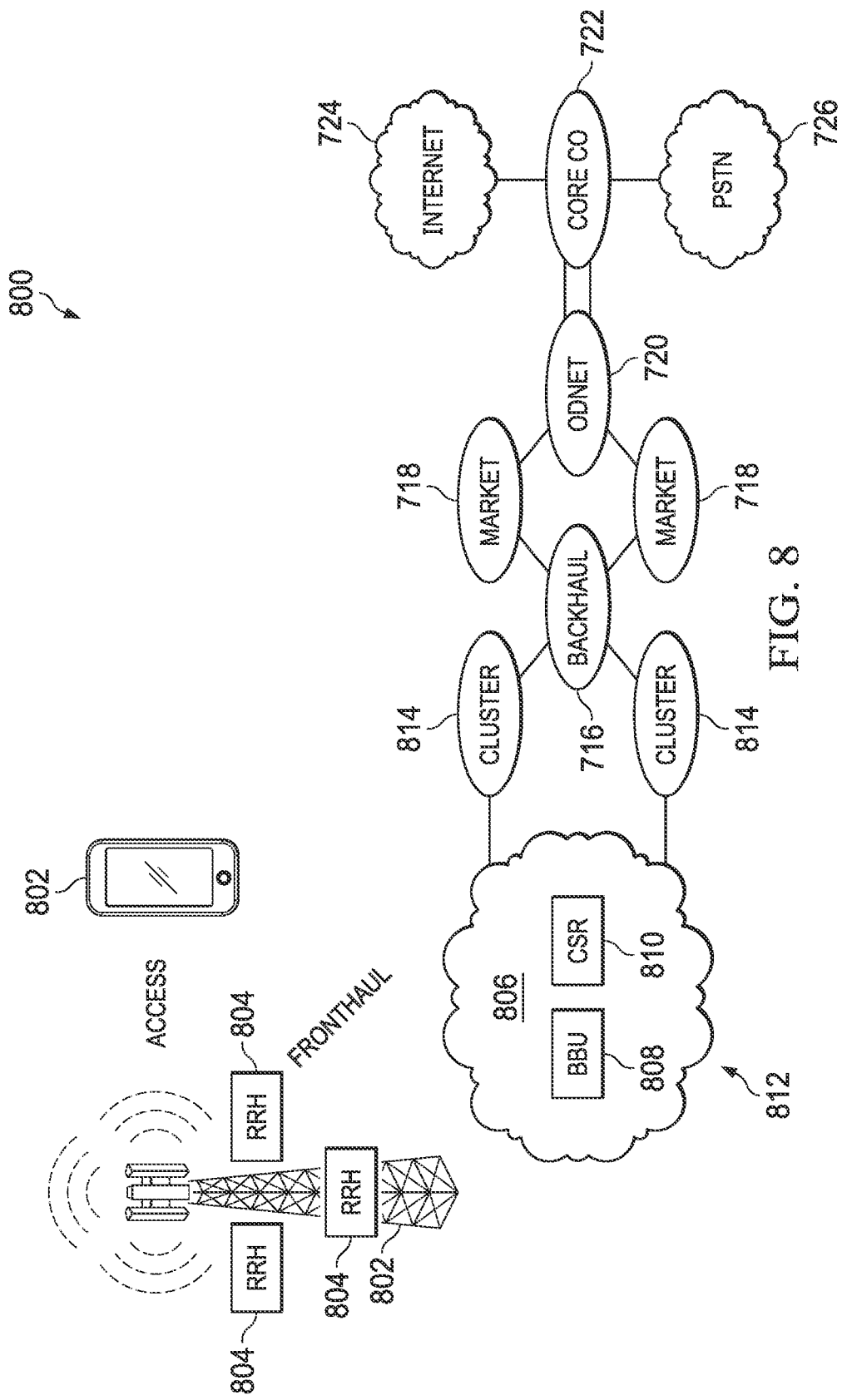
FIG. 8 illustrates a virtual radio access network.

Referring now to FIG. 8, a virtual radio access network 800 is illustrated. Within the virtual radio access network 800, the configuration from the backhaul network 716 to the core central office 722, and the core central offices connections to the Internet 724 and the PSTN 726 are the same as that described with respect to the traditional network 700 of FIG. 7. The user device 702 communicates with and antenna 802 over wireless communication links. The remote radio heads 804 are located at the antenna 802 rather than a base station. The remote radio heads are in communication with a virtual base station 806 virtualized within the cloud that implements a baseband unit 808 and channel state report 810 within the network cloud 812. Virtualized functions are implemented using NFV as will be more fully discussed herein below. Virtualized functions may also use SDN wherein the control functions are taken out of the hardware and implemented within software as will be more fully described. The BBUs communicate with the RRHs over a fronthaul which may be fiber or wireless. The virtual base stations 806 are associated with other clusters 814 that communicate through the backhaul network 716 as described previously.

As systems evolve towards RAN2020, CloudRAN architecture is used to implement RAN real time functions, on-demand deployment of non-real-time resources, component-based functions, flexible coordination, and RAN slicing. With Mobile Cloud Engine (MCE), CloudRAN can support orchestration for RAN real time and non-real-time functions based on different service requirements and transmission resource to perform cloudification (and virtualization) of the RAN.

The RAN real time functions include access network scheduling, link adaptation, power control, interference coordination, retransmission, modulation, and coding. These functions require high real-time performance and computing load. The deployment of sites must include dedicated hardware with high accelerator processing and be located in close to services. The RAN non-real-time functions include inter-cell handover, cell selection and reselection, user-plane encryption, and multiple connection convergence. These functions need low real-time performance and latency requirements and are fit for centralized deployment. MCE can support management and coordination for multiple processing capabilities based on regional time, frequency bands, and space. This architecture allows CloudRAN to support 4G, 4.5G, 5G (different bands), and Wi-Fi, and coordination of macro, micro, pico and COMP massive MIMO sites (over licensed, shared and unlicensed bands). Network functions are deployed on radio, backbone, or core nodes to maximize network efficiency.

Multi-connectivity is fundamental to the network architecture. Multi-connectivity with carrier aggregation can support the usage of licensed, shared and unlicensed bands to provide bandwidth hungry applications used by power users that leverage small cells or massive MIMO. CloudRAN can be deployed in a unified network architecture. In current fragmented networks, increasing speed and reducing latency can improve user experience. Reliable high-speed data cannot depend on a single frequency band or standard connections. In heterogeneous networks, multi-connectivity helps provide an optimal user experience based on LTE and 5G capabilities, such as high bandwidth and rates of high frequency, network coverage and reliable mobility of low frequency, and accessible Wi-Fi. This could mean a combined coordination of licensed, shared and unlicensed bands to support power users that use high-bandwidth applications. In scenarios that require high bandwidth or continuity, a user requires multiple concurrent connections. For example, data aggregation from multiple subscriptions to 5G, LTE, and Wi-Fi (licensed, shared and unlicensed bands) to aggregate and produce high bandwidth. An LTE network access has to maintain continuity after a user has accessed a 5G high-frequency small cell.

In scenarios that have multiple technologies, CloudRAN can be an anchor for data connection which reduces alternative transmission. In the traditional architecture integrating base stations as an anchor for data connection, LTE, 5G, and Wi-Fi data is aggregated into a non-real time processing module of a specific standard to be forwarded to each access point. In this CloudRAN architecture, non-real time processing functions in access points of different modes are integrated into the MCE, which is as an anchor for data connection. Data flows are transmitted to each access point over the MCE, which prevents alternative transmission and reduces transmission investment.

Figure 9:
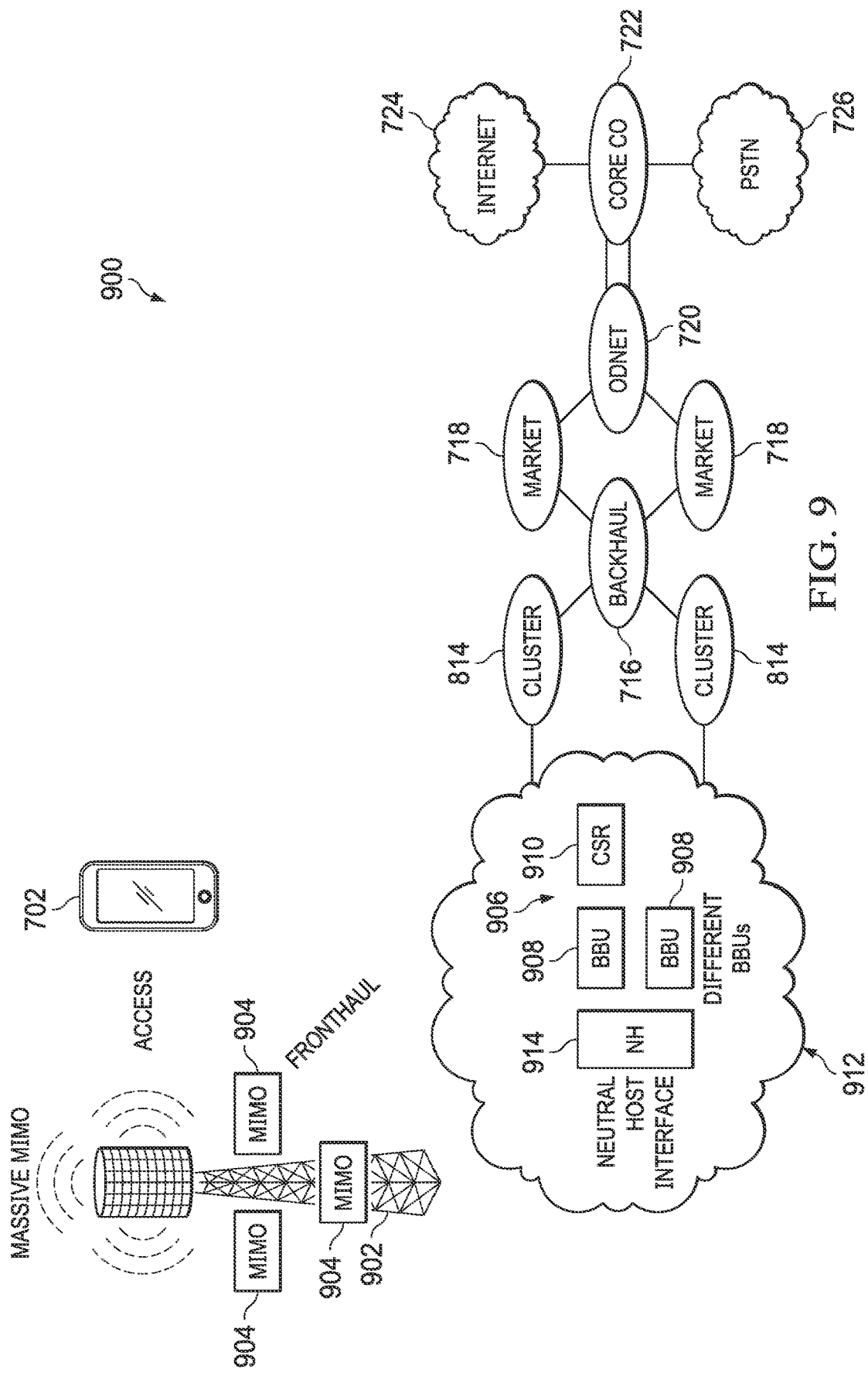
FIG. 9 illustrates a massive MIMO neutral host network.

Referring now to FIG. 9, a virtual radio access network 900 is illustrated. Within the virtual radio access network 900, the configuration from the backhaul network 716 to the core central office 722 and the core central offices connections to the Internet 724 and the PSTN 726 are the same as that described with respect to the traditional network 700 of FIG. 7. The user device 702 communicates with and antenna 902 over wireless communication links. The antenna 902 includes a number of massive MIMO antenna configurations 904 providing multiple input multiple output transceiver capabilities such as those disclosed in U.S. patent application Ser. No. 15/216,474, entitled SYSTEM AND METHOD FOR COMBINING MIMO AND MODE-DIVISION MULTIPLEXING, filed on Jul. 21, 2016, now U.S. Pat. No. 9,998,187 issued Jun. 12, 2018, which is incorporated herein by reference in its entirety. The MIMO transceivers 904 are located at the antenna 902 rather than a base station. The MIMO transceivers 904 are in communication with a virtual base station 906 that implements a plurality of baseband unit 908 that are each associated with different MIMO transceivers 904, different network providers and channel state report 910 within the network cloud 912. A neural host interface 914 controls the interactions between the MIMO transceivers 904 and the base band units 908. The virtual base stations 906 are associated with other clusters 914 that communicate through the backhaul network 716 as described previously.

Figure 10:
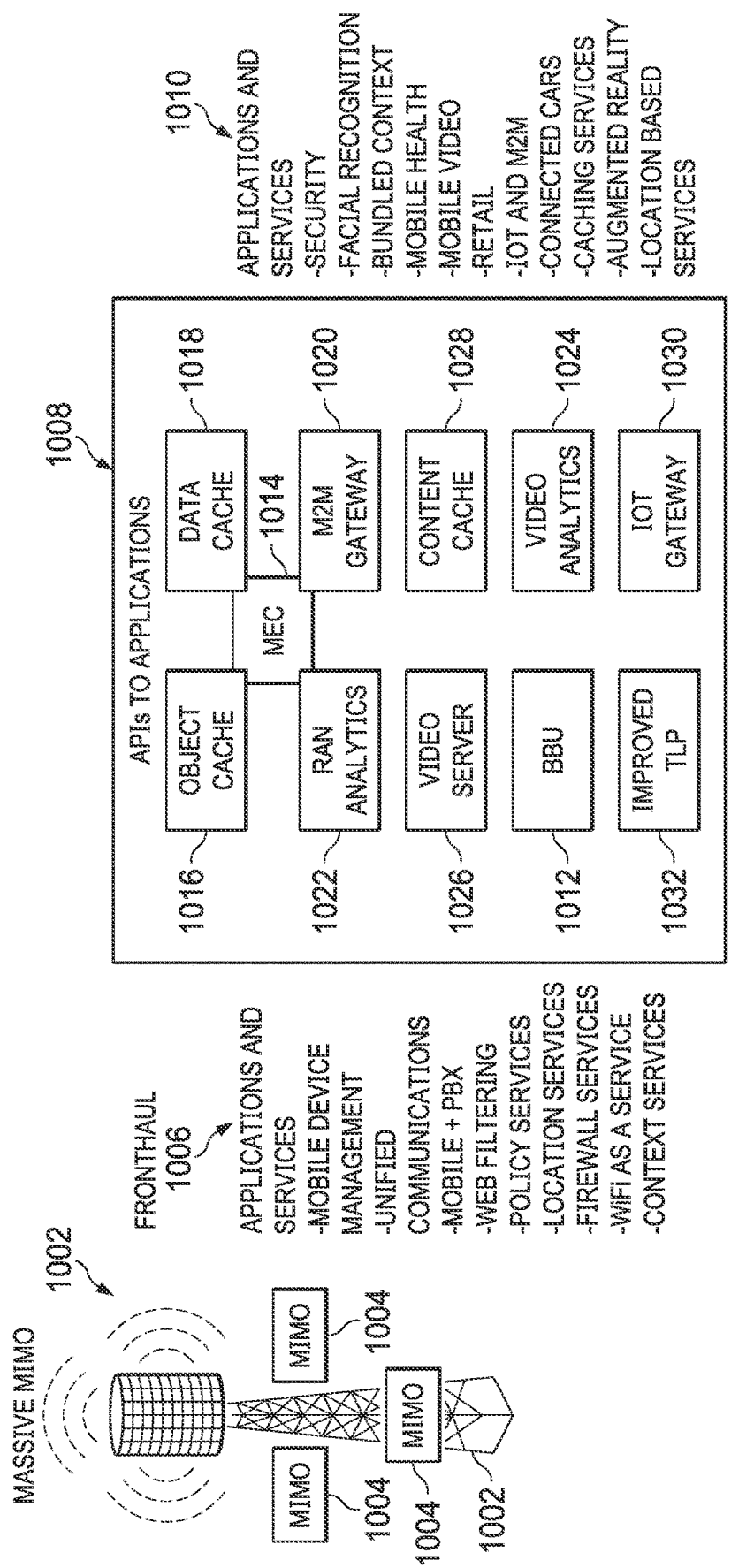
FIG. 10 illustrates an implementation of a virtual radio access network, mobile edge computing and network slicing.

Referring now to FIG. 10, there is illustrated an implementation of a virtual radio access network, mobile edge computing and network slicing as discussed previously with respect to FIG. 3. The virtual radio access network would control an antenna tower 1002 that implements a number of MIMO transceivers 1004 therein. A number of applications and services 1006 may be supported by the combination of VRAN, MEC and network slicing may be provided between VRAN system and application program interfaces to applications 1008 within connecting devices. The applications and services 106 associated with the antenna 1002 comprise mobile device management, unified communications, mobile and PBX, web filtering, policy services, location services, firewall services, Wi-Fi is a service, context services. Additional apps and services 1010 may be provided to APIs 1008 on the user device side. These apps and services comprise things such as security, facial recognition, bundled content, mobile health, mobile video, retailed, Internet of things and mobile to mobile, connected cars, caching services, all and in reality and location-based services. These are low latency applications that need to be moved from the core to the network edge.

The application program interfaces and 1008 to the various applications and services utilize the VRAN services through the BBU 1012 and other applications and services may be implemented using mobile edge computing 1014. Application program interfaces 1008 that may utilize the mobile edge computing 1014 and BBU functionalities 1012 include an object cache API 1016 for enabling storage of objects, data cache API 1018 for enabling storage of data, the M2M (mobile to mobile) gateway API 1020 provides for interconnection between mobile devices and the RAN analytics API 1022 for providing radio network analytics. Other APIs 1008 includes the video analytics API for analyzing video transmission parameters, a video server API 1026 for controlling transmission of video data, a content cache API 1028 four storing content, an IOT (Internet-of-things) gateway 1030 for controlling interactions with IOT devices and an improved transport control protocol API 1032 for managing and improving the TCP protocol used for transmitting data within the network.

Figure 11A:
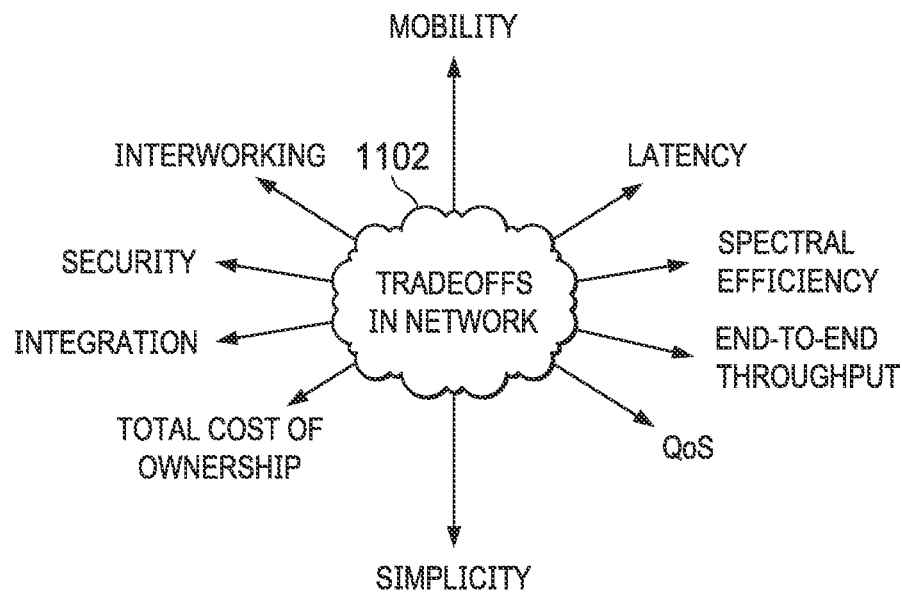
FIG. 11A illustrates various trade-off factors when considering overall network performance.

Referring now to FIG. 11A there are illustrated the various trade-offs that must be considered within the network when trying to improve overall network performance. A number of factors may be considered in determining trade-offs in network performance 1102. By selecting improved performance of certain of these factors others of the factors would by necessity have to have a decrease performance level. The factors which must be balanced include interworking, mobility, latency, spectral efficiency, into a throughput, quality of service, simplicity, total cost of ownership, integration and security. Interworking is the method for interfacing a wireless communications network with the public switched telephone network. The interworking function (IWF) provides the function to enable a GSM system to interface with various forms of public and private networks currently available. Mobility relates to the capability of moving or being moved while a wireless device is being used. Latency is the delay within the network. Spectral efficiency comprises the information rate that can be transmitted over a given bandwidth within the network. End-to-end throughput is the amount of data sent or received through a communications link. Quality of service (QOS) relates to the capability of a network to offer service with a certain quality. Simplicity relates to the level of complexity within the network. Total cost of ownership relates to the cost required for providing and implementing the network. Integration relates to the implementation of network components within a network. Security relates to the level of security provided within the network for access.

Figure 11B:
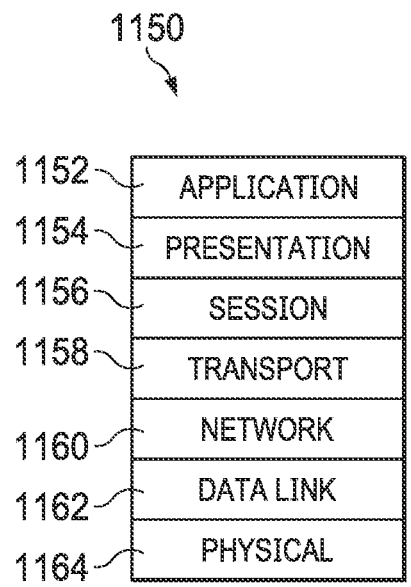
FIG. 11B illustrates the layers of it the open systems interconnection model.

Referring now to FIG. 11B there are illustrated the layers of the Open Systems Interconnection model 1150. The Open Systems Interconnection model (OSI model) is a conceptual model that characterizes and standardizes the communication functions of a telecommunication or computing system without regard to their underlying internal structure and technology. Its goal is the interoperability of diverse communication systems with standard protocols. The model partitions a communication system into abstraction layers. The original version of the model defines seven layers. A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer. In order to provide network optimization, different slices of the layers would use different portions of the layers to different applications and services. The portions of each layer used would depend on the needs of the application or service.

The application layer 1152 operates on data and provides high-level APIs, including resource sharing and remote file access. The presentation layer 1154 operates on data and provides for translation of data between a networking service in an application. This includes things such as character encoding, data compression and encryption/decryption. The session layer 1156 operates on data and provides for managing communication sessions. Communication sessions comprise continuous exchange of information in the form of multiple back-and-forth transmissions between nodes. The transport layer 1158 operates on segments and datagrams to provide for the reliable transmission of data segments the tween points on a network. This includes processes such as segmentation, acknowledgement and multiplexing. The network layer 1160 operates on packets and provides structure and management within a multi-node network. These include processes such as addressing, routing and traffic control. The data link layer 1162 operates on frames to provide for the reliable transmission of data frames between two nodes connected by a physical layer. Finally, the physical layer 1164 operates on symbols for the transmission and reception of raw bit streams over a physical medium. Each of the layers of the OSI model 1150 may improve certain characteristics in a flexible manner using network slicing as described herein. Therefore, based upon the particular type of application or service being implemented within the network the operation of the network with respect to the application within the OSI model may be uniquely configured based upon the needs of the application or service.

Figure 12:
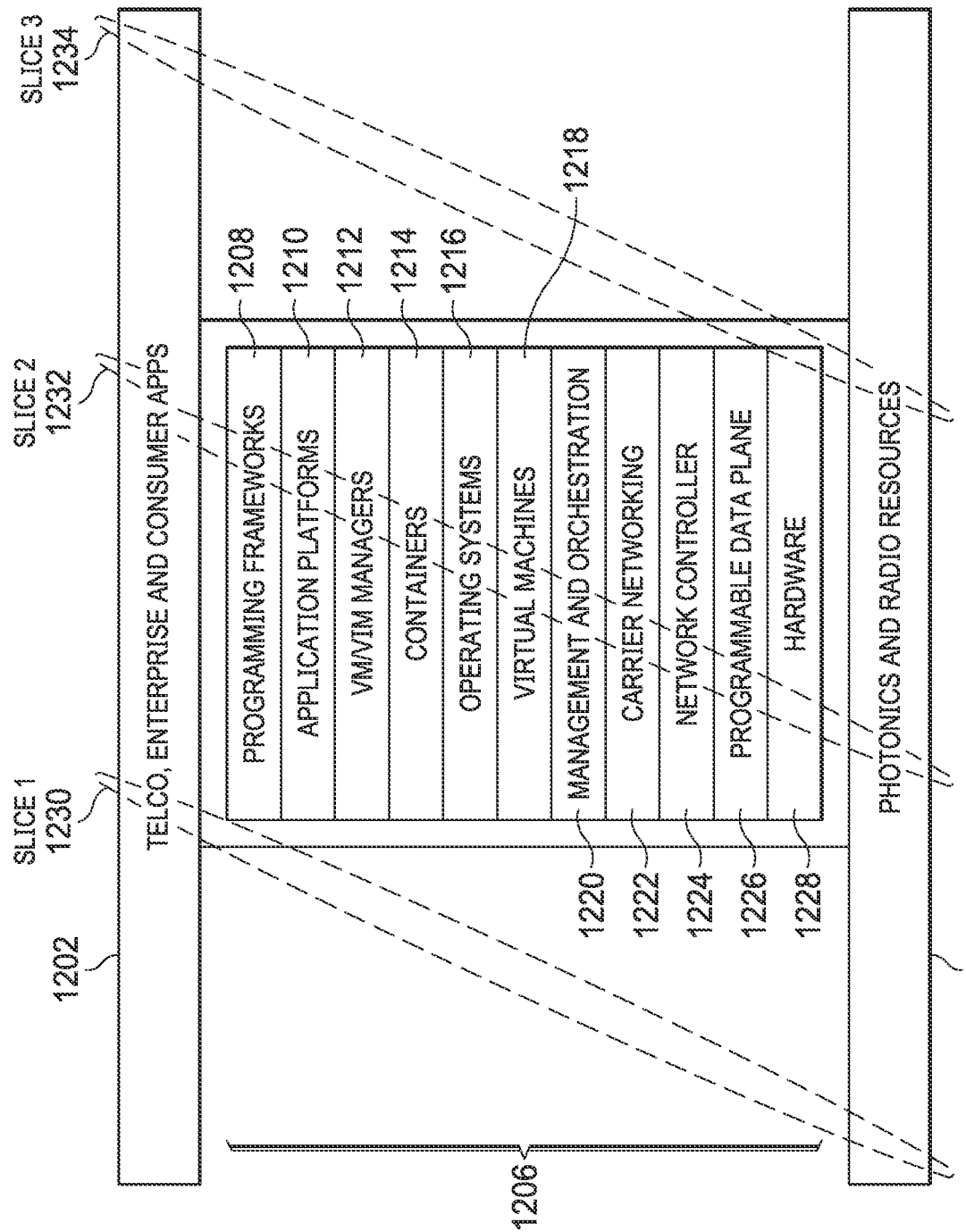
FIG. 12 illustrates a configurable wide area network interconnecting various resources through the cloud.

Referring now to FIG. 12, there is illustrated a more particular manner in which the configurable wide area network 202 may be implemented in order to provide flexible network resources based upon an application's or service's particular needs. Various telco, enterprise and consumer applications 1202 utilize various photonic and radio resources 1204 through a number of control layers 1206. The control layers 1206 represent the EdgeCom Open Source reference stack. The control layers 1206 include the programming frameworks layer 1208; application platforms layer 1210; VM/VIM managers layer 1212; containers layer 1214; operating systems layer 1216; virtual machines layer 1218; management and orchestration layer 1220; carrier network layer 1222; network controller layer 724; programmable data plane layer 726 and hardware layer 1228. Various portions of each of the layers 1206 are needed to provide interconnection between the telco, enterprise and consumer applications 1202 and the photonic and radio resources 1204.

As described previously, current network topologies configure the layers to support peak periods. This requires the network to be over configured for all but a small percentage of its operating time. Each of the control layers 1206 provide differing amounts of control depending upon the applications 1202 and network resources 1204 that are being utilized by the system. Thus, various slices of the control layers 1206 are utilized when providing particular applications 1202 using particular resources 1204. Thus, slice 1230, slice 1232 and slice 1234 each utilize various, differing and adaptable portions of the control layers 1206 in order to operate a particular application using particular resources. These slices 1230-1234 can be dynamically adjusted within the system applications and resources depending upon changing system needs. Thus, a slice 1230, 1232, 1234 can be uniquely and adaptively configured to utilize only those network control layers 1206 and only those portions of the network control layers that are necessary in order to have the application function in a desired fashion. Thus, the availability of the network control layers 1206 can vary depending upon the particular slices 1230, 1232, 1234 that are being currently utilized by the network.

Figure 13:
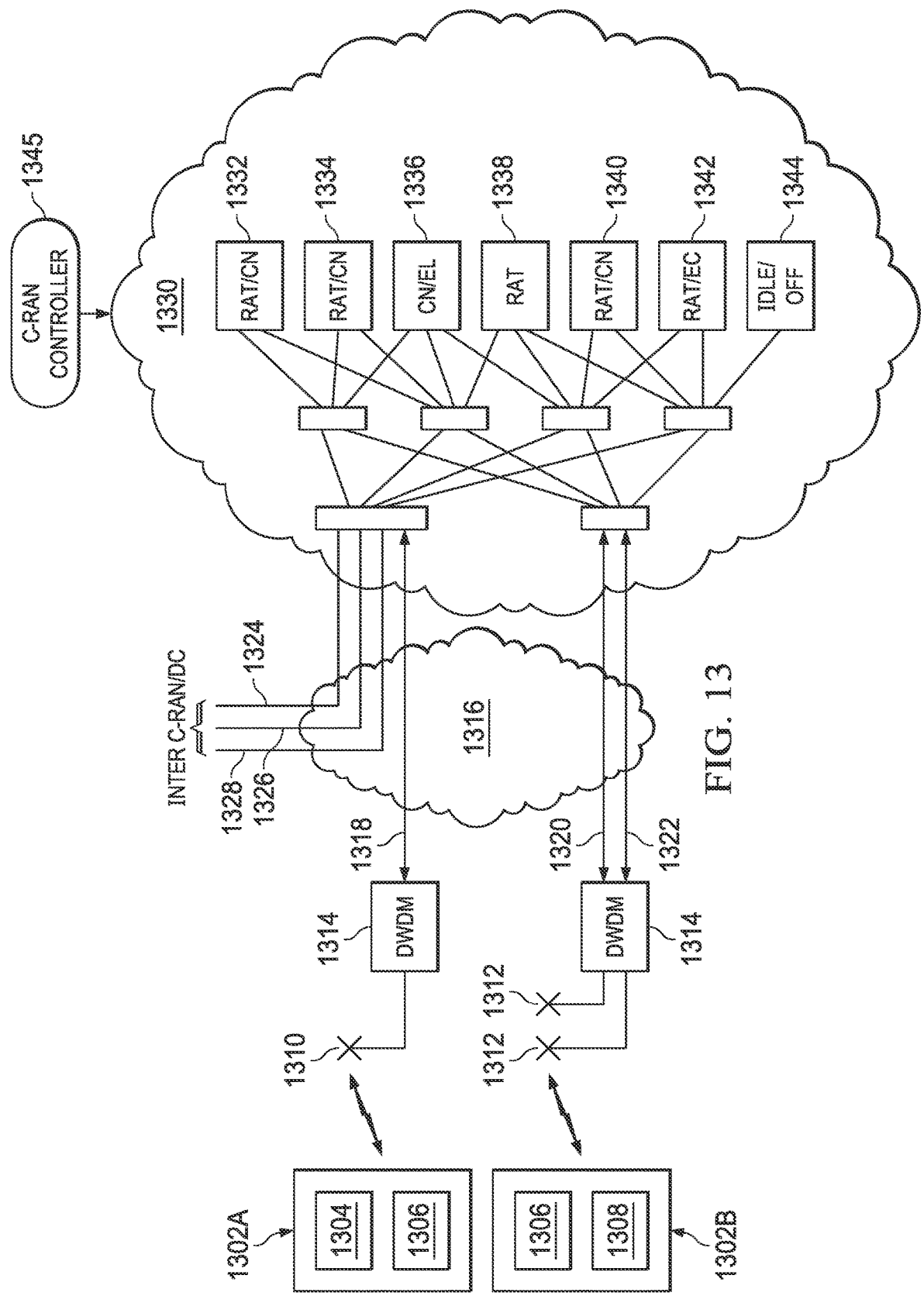
FIG. 13 illustrates a virtualization and slicing process under software control within a cloud radio access network.

Referring now to FIG. 13, there is illustrated a virtualization and slicing process under software control within a cloud radio access network (C-RAN). First and second user devices 1302 each implement first and second applications 1304, 1306 in the case of device 1302A and second and third applications 1306, 1308 in the case of device 1302B. The user devices 1302 are in wireless communication with antennas 1310 and 1312. Antenna 1310 is associated with the digital radio network while antennas 1312 are associated with an analog, digital or packet radio network. Each of the antennas 1310, 1312 are connected to a dense wavelength division multiplexer 1314. The multiplexer 1314 implements an optical multiplexing technology that combines and transmits multiple signals simultaneously on different links over the same fiber. The multiplexer 1314 establishes a connection through a TSDN hybrid slice fronthaul IDC backhaul 1316 link 1318 is associated with application 1306. Link 1320 is associated with application 1304, and link 1322 is associated with application 1308.

A number of GE 400 links 1324-1328 are provided from an Inter C-RAN/DC network to a CORE/vEPC network through the TSDN hybrid slice fronthaul IDC backhaul 1316 to the C-RANs 1330. Link 1324 is associated with application 1306. Link 1326 is associated with application 1304, and link 1328 is associated with application 1308.

The cloud radio access network 1330 consist of a number of resources including radio access terminals (RATs), CORE network (CN), mobile edge computing (MEC) and other types of server/core functions. In the example of FIG. 13, a number of RAT/CN servers 1332, 1334 and 1340 are used along with CN/EC (edge computing) server 1336, RAT server 1338, RAT/EC server 1342 and an idol/off server 1344. The cloud radio access network 1330 is controlled through a C-RAN controller 1345.

Any resource may be part of any slice. In the example of FIG. 13, a first slice is associated with application 1304 and consists of links 1320, 1326 and resources 1338 and 1340. The first slice provides ultra-reliable, low bandwidth, long rang and high mobility connection. A second slice is associated with application 1306 and consist of links 1318, 1324 and resources 1332, 1334 and 1336. The second slice provides the highest bandwidth for short range connections. A final slice is associated with application 1308 and consists of links 1322, 1328 and resources 1340 and 1342. The final slice provides the lowest delay to be used for low signaling connections. Idle resources such as resource 1344 may be moved from one slice to another depending upon the needs of the particular slice. Additionally, presently assigned links and resources may be dynamically adjusted depending upon the needs of a particular slice. Resources include virtual machine servers, intra/inter C-RAN B/W, C-RAN to radio configurations of base station and UE devices.

Figure 14:
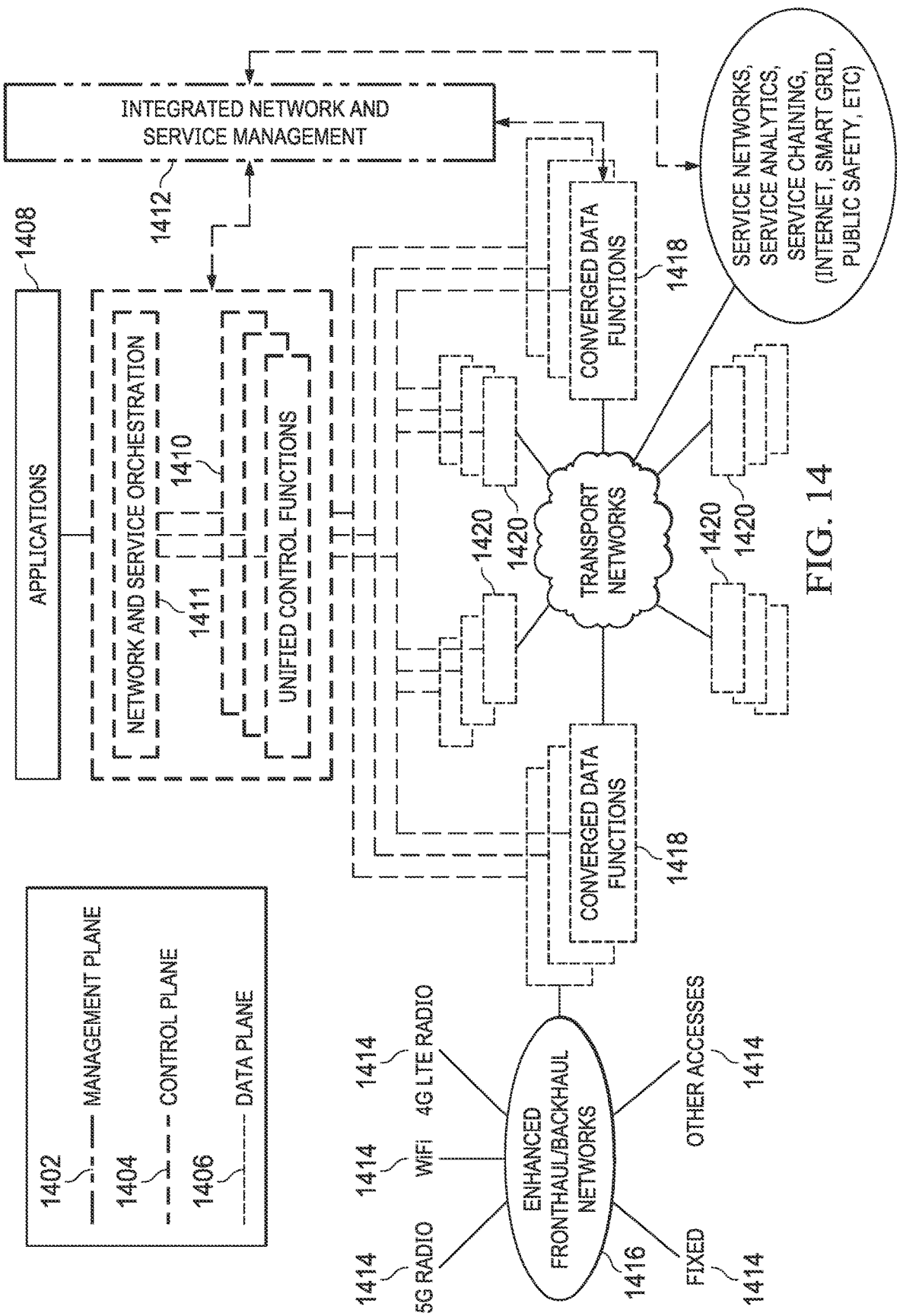
FIG. 14 illustrates various network functions and their associated plane within a network.

Referring now to FIG. 14 there are illustrated various network functions and the plane they are associated with within the network. The network includes a management plane 1402, control plane 1404 and data plane 1406. Each of these planes is separate from each other and has its own physical channel associated therewith. The management plane 1402 interacts with the operator of a network and carries administrative traffic. The control plane 1404 is the part of the network that carries signaling traffic and is responsible for routing. Functions of the control plane 1404 include system configuration and management. The data plane 1406 processes the traffic transported through the network.

Applications 1408 interact with the control plane 1404 or through unified control functions 1410 that provide for network and service orchestration 1412. Integrated network and service management 1412 which comprises part of the management plane 1402 also interacts with the unified control functions 1410. Various networks 1414 such as 5G radio, Wi-Fi, 4G LTE radio, fixed and other access network types connect with an enhanced front haul/backhaul networks 1416. Converge data functions 1418 comprise part of the data plane 1406 and provide interconnections between the enhanced front haul/backhaul network 1416 and various transport networks 1420. The converged data functions 1418 also provide for interconnection between the transport networks 1420 and the integrated network and service management 1412. The converged data functions 1418 and transport network 1420 interact with the unified control functions 1410 of the control plane 1404 to provide for transport of data through the transport networks 1420. The integrated network and service management 1412 interacts with the transport networks 1420 to provide various functionalities 1422 including service networks, service analytics, service chaining (Internet, smart grid, public safety, etc.).

Figure 15:
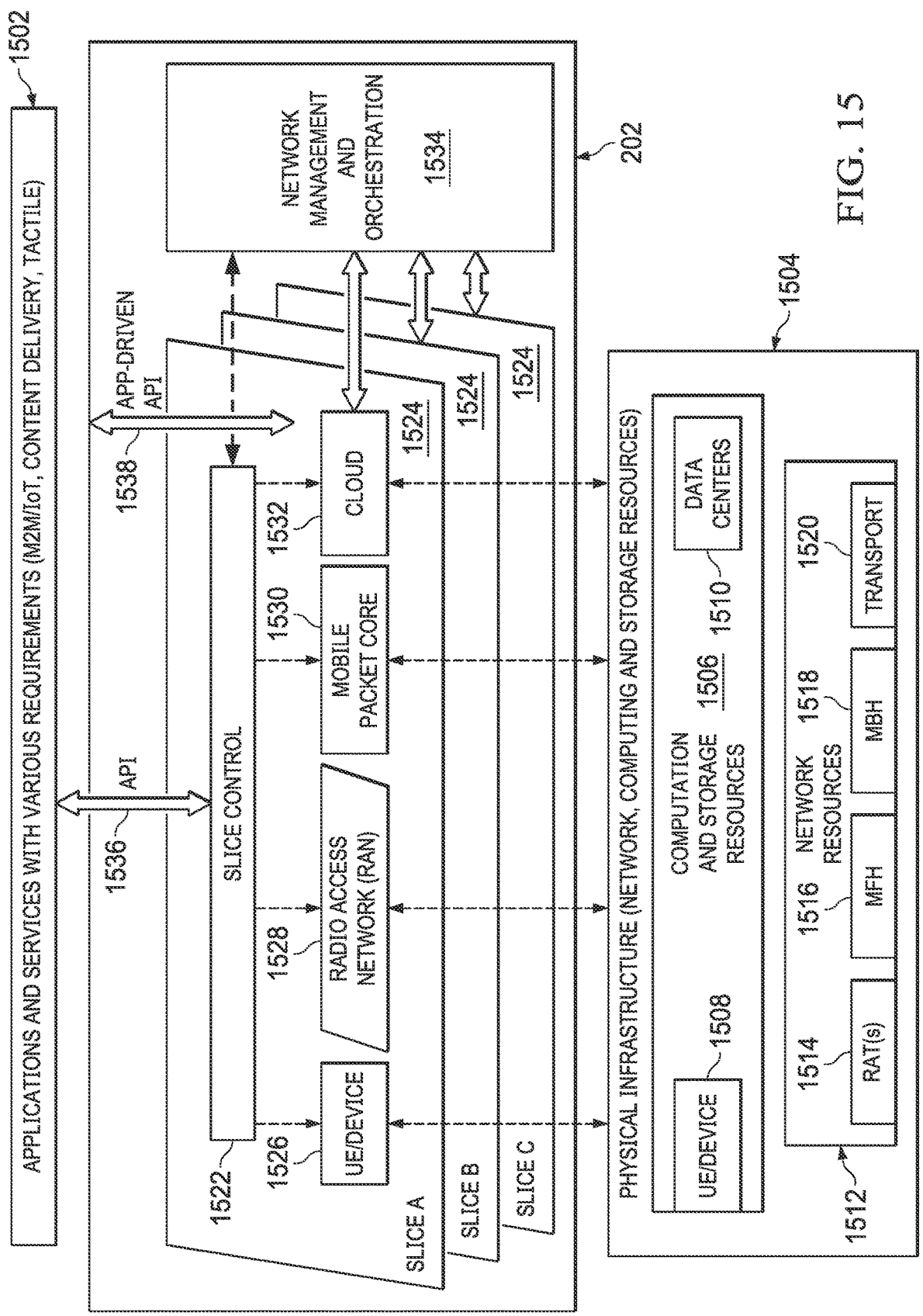
FIG. 15 illustrates a manner in which a configurable wide area network controls interactions between applications and infrastructure.

Referring now to FIG. 15, there is illustrated the manner in which the configurable wide area network 202 controls interactions between applications and services 1502 and the physical infrastructure 1504. The applications and services 1502 are located within an application layer and have various requirements that differ depending upon the bandwidth needs of the application or service. The physical infrastructure 1504 is included within the physical layer hardware and comprises computation and storage resources 1506 including items such as user equipment and devices 1508 and data centers 1510 storing information and accessible resources. The user equipment and devices 1508 represent handsets, mobile terminals, sensors, actuators, etc. The physical infrastructure 1504 further includes network resources 1512 such as radio access towers 1514, the mobile fronthaul 1516, the mobile backhaul 1518 and the transport network 1520.

The configurable wide area network 202 comprises the network layer where network functions are implemented in software and includes slice control 1522 for selecting the network resources that are required in order to implement a particular application or service that is currently being utilized. The slice control 1522 utilizes a number of factors and domain specific orchestration controls in order to establish a particular slice 1524. These include user equipment/device control 1526, radio access network control 1528, mobile packet core control 1530 and cloud control 1532. The domain specific orchestration controls may exist individually and for each network provider. The slice control 1522 communicates with the various applications and services through an application program interface 1536. The network resource controllers 1526-1532 communicate with the applications and services through an app driven API. Network management and orchestration 1534 works with the slice control 1522 and the various network resource controls 1526-1532 in order to establish the various slices 1524. Network management and orchestration 1534 consolidates management of inter-slice, slice lifecycle and resource management over multiple network domains in end-to-end connections. Within individual slices 1524, virtual network functionalities (VNFs) and virtual transport paths are mapped on the sliced network topologies. The slices 1524 encompass capabilities of transport control and network functionalities.

Figure 16:
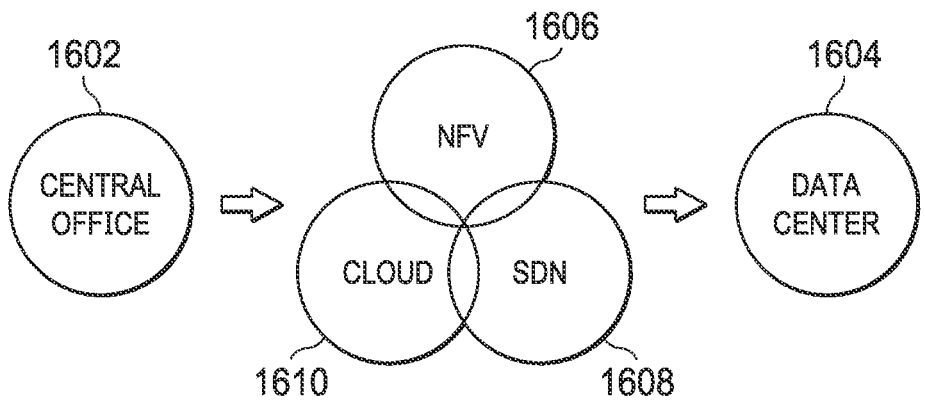
FIG. 16 illustrates the manner in which a central office may be converted to a data center.

Referring now to FIG. 16, there is illustrated the manner in which a central office 1602 may be converted to a data center 1604 (CORD). The conversion from central office functionalities 1602 to data center functionalities 1604 are carried out using a combination of network function virtualization (NFV) 1606, software defined networks (SDN) 1608 and the cloud 1610 that enables the central office 1602 to be re-architected as the data center 1604. The operation of NFV 1606 and SDN 1608 will be discussed more fully herein below. This reconfiguration of the central office 1602 to a data center 1604 provides for rapid innovation, re-personalizable hardware, agile dev-op models, low cost operating expenses, application network awareness, service programmability, customer control and quick deployment options.

The cloud adaptation of networks, operation systems, and services is the core for an "all cloud" approach to the network (hardware resources, distributed software architecture, and automatic deployment). Operators transform networks using a network architecture based on data center (DC) 1604 in which all functions and applications are running on the cloud data center (cloud-native architecture).

Figure 17:
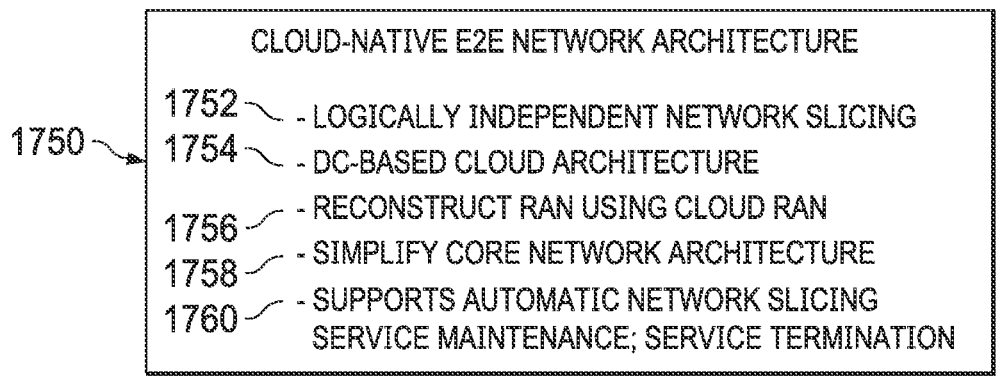
FIG. 17 illustrates a single network infrastructure supporting different services and applications.

As shown in FIG. 17, in this architecture, a single network infrastructure can support different services and applications. This Cloud-Native E2E network architecture 1750 has the following attributes. The architecture 1750 provides logically independent network slicing 1752 on a single network infrastructure for different service requirements and provides DC-based cloud architecture 1754 to support various application scenarios. The architecture 1750 further uses Cloud RAN and RAN Slicing 1756 to reconstruct radio access networks (RAN) to support massive connections of multiple standards and implement on-demand deployment of RAN functions. The architecture 1750 also simplifies core network architecture 1758 to support on-demand network functions through control and user plane separation and unified database management. Finally, the architecture 1750 supports automatic network slicing service generation, maintenance, and termination for different services 1760 to reduce operating expenses.

New communication requirements for different services are difficult on existing networks in terms of technologies and business models. The mobile network described herein must support different demands from different applications in different industries on a single network. The international telecommunications union (ITU) has classified 5G mobile network services into three categories: Enhanced Mobile Broadband (eMBB), Ultra-reliable and Low-Latency Communications (uRLLC), and Massive Machine Type Communications (mMTC). The eMBB service targets people's demand for a digital lifestyle and focuses on services that have high requirements for bandwidth, such as high definition (HD) videos, virtual reality (VR), and augmented reality (AR). The high bandwidth requirements of eMBB are supported by using SDR-based coordinated multipoint (COMP) massive MIMO. The uRLLC service focuses on latency-sensitive services, such as assisted and automated driving, and remote management. The mMTC service focuses on services that include high requirements for connection density, such as smart city and smart agriculture. However, a network is needed where all of these different types of networks are possible on one infrastructure and allow network slicing E2E. The described system enables enhanced mobile broadband (eMBB), ultra-reliable low latency communications (URLLC) and massive machine type communication (mMTC) to each be provided on a single infrastructure using end-to-end network slicing.

A number of traditional industries, such as automotive, healthcare, energy, and municipal systems participate in the construction of this ecosystem. 5G allows digitalization process from personal entertainment to society interconnection. The driving forces behind the network architecture transformation include the following aspects. A first factor involves complex networks incorporating multiple services, standards and sites. 5G networks must be able to provide diversified services of different KPIs, support co-existent accesses of multiple standards (5G, LTE, and Wi-Fi), and coordinate different site types (macro, micro, pico base stations as well as massive MIMO). The design challenge to create a network architecture capable of supporting such flexibility while meeting differentiated access demands is very complex to optimize. Another factor involves coordination of multi-connectivity technologies. 5G is expected to co-exist with LTE and Wi-Fi for a long time incorporating multi-connectivity technologies and the new 5G air interface. Multi-connectivity technologies must be coordinated based on traffic and mobility requirements of user equipment to provide sufficient transmission throughput and mobile continuity.

The network must also provide on-demand deployment of services on the site or on the access cloud side. 5G network architecture will be designed based on access sites and three-layer DCs. According to different service requirements, fiber/optic cable availability and network resource allocations, RAN real time and non-real time resources can be deployed on the site or on the access cloud side. This requires that the service gateway location may also be deployed on the access cloud or on the core network side. The network must also provide for flexible orchestration of network functions. Service requirements vary with different network functions. A eMBB service requires a large throughput for scheduling. A uRLLC service requires ultra-low latency and high reliability. Networks must flexibly orchestrate network capabilities considering service characteristics, which significantly simplify network functions and increase network efficiency. Finally, a network must provide a shorter period of service deployment. Different services have expanded the mobile network ecosystem and increased network deployment complexity. Rapidly deploying new services requires better lifecycle management processes involving network design, service deployment, and O&M to rapidly deploy new services.

The service-driven 5G network architecture has to be flexible and efficiently support diversified mobile service requirements. This is achieved using a combination of SDN 1608 and NFV 1606. With software-defined networking (SDN) 1608 and Network Functions Virtualization (NFV) 1606 supporting the underlying physical infrastructure, 5G comprehensively cloudifies and can further virtualize access, transport, and core networks. Cloud solutions 1610 can better support diversified 5G services, and enables the key technologies of E2E network slicing, on-demand deployment of services, and component-based network functions.

CloudRAN 1756 would include sites and mobile cloud engines. This architecture 1750 coordinates multiple services, operating on different standards, in various site types for RAN real time resources that require many computing resources. Networks implement policy control using dynamic policy in the unified database on the core network side. Component-based control planes and programmable user planes allow for network function orchestration to ensure that networks can select control-plane or user-plane functions according to different service requirements. The transport network consists of SDN controllers and underlying forwarding nodes. SDN controllers generate a series of specific data forwarding paths based on network topology and service requirements to implement network optimization or open network capabilities in the API. The top layer of the network architecture implements E2E automatic slicing and network resource management 1760.

Figure 18:
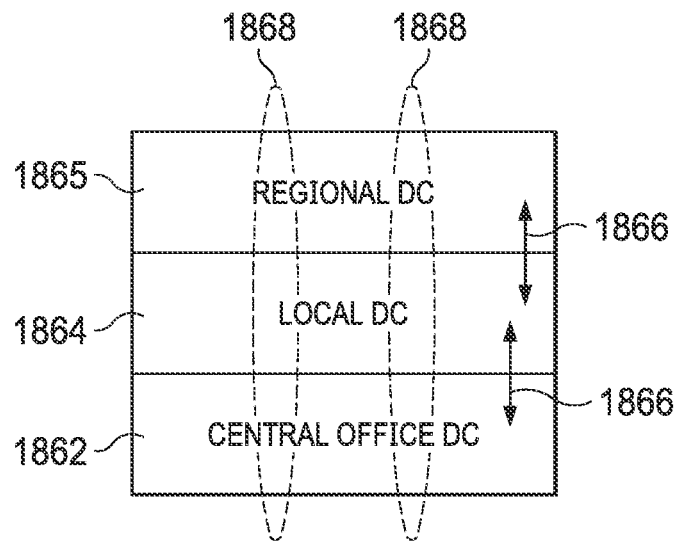
FIG. 18 illustrates a three layer cloud data center.

E2E network slicing 1752, 1760 is a foundation to support diversified 5G services and is key to 5G network architecture evolution. Based on NFV 1606 and SDN 1608, physical infrastructure of the future network architecture would include sites and three-layer DCs. Sites support multiple modes (such as 5G, LTE, and Wi-Fi) in the form of macro, micro, and pico base stations and corresponding COMP massive MIMO at different bands to implement the RAN real time function. These functions have high requirements for computing and real-time performance and require dedicated hardware. As shown in FIG. 18, three-layer cloud DC includes computing and storage resources to meet the high requirements for computing and real time performance. The bottom layer 1862 is the central office DC, which is closest in relative proximity to the base station side. The second layer 1864 is the local DC, and the third layer 1865 is the regional DC, with each layer of arranged DCs connected through transport networks 1866.

As discussed previously based on this architecture to diversify services, networks have topologies and a series of network function (network slices 1868) for each corresponding service type using NFV 1806 on a unified physical infrastructure. Each network slice 1868 is derived from one unified physical network infrastructure, which reduces operators' network costs. Network slices 1868 feature a logical arrangement and are separated as individual structures, which support customizable service functions and independent O&M (operation and maintenance.

As indicated, eMBB, uRLLC, and mMTC are independently supported on a single physical infrastructure. The eMBB slicing has high bandwidth requirements and has to cache in the mobile cloud engine of a local DC 1864, which supports high-speed services located close to users, reducing bandwidth requirements of the backbone network. The uRLLC slicing has strict latency needs in application of self-driving, assistant driving, and remote management and must be deployed in the mobile cloud engine of the central office DC 1862 (closer to the end user). V2X Server and service gateways must be deployed in the mobile cloud engine of the central office DC 1862, with only control-plane functions deployed in the local 1864 and regional DCs 1865. The mMTC slicing has low network data interaction and a low frequency of signaling interaction in most mMTC applications and the mobile cloud engine can be located in the local DC, with other functions deployed in the regional DC 1865, which releases central office 1862 resources and reduces operating expenses. Therefore, mobile cloud engine can be in the local DC 1864, and other functions and application servers can be deployed in the regional DC 1865, which releases central office 1862 resources and reduces operating expenses.

Figure 19:
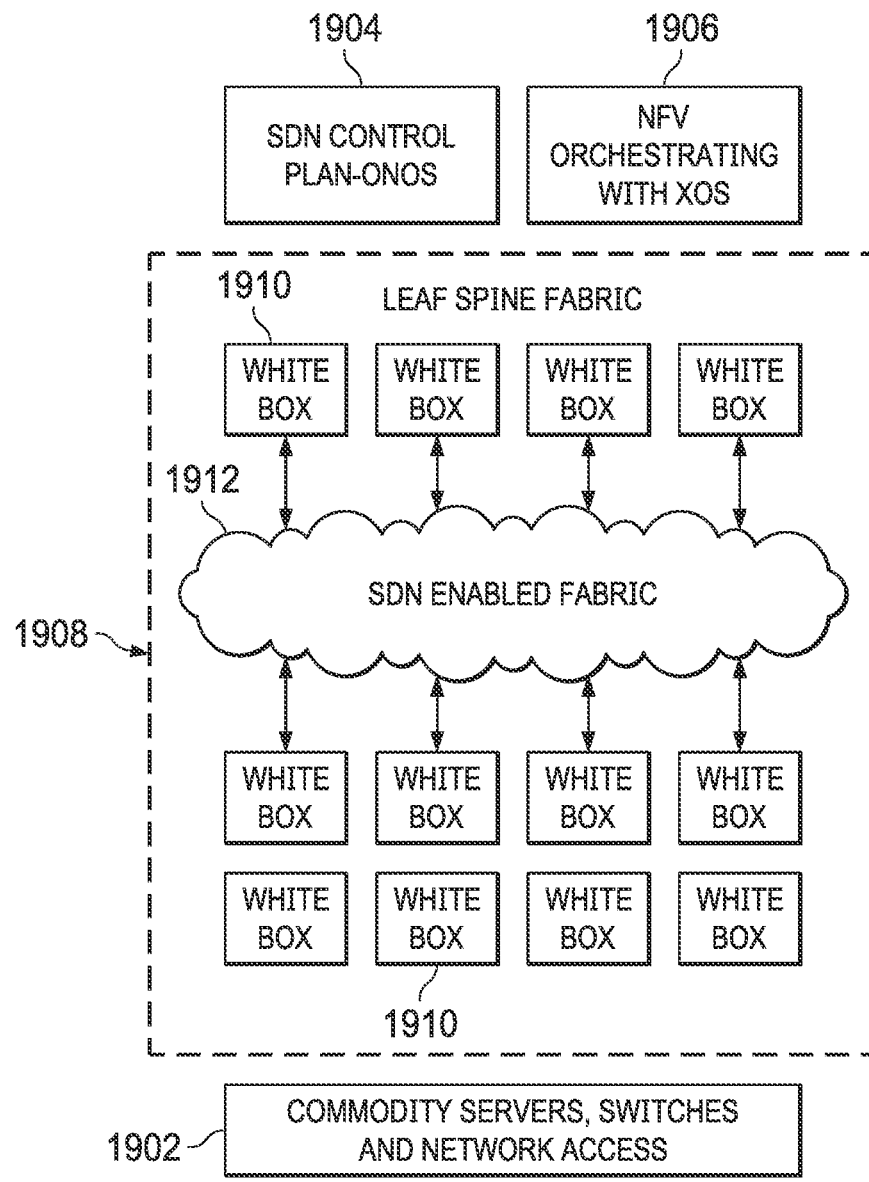
FIG. 19 illustrates the virtualization of the central office to the data center.

FIG. 19 more particularly illustrates the virtualization of the central office 1202 to the data center 1204 using the combination of NSV 1206, SDN 1208 and the cloud 1210. The process uses a number of commodity servers, switches and network access devices 1902 that may be used in combination with SDN control 1904 and NFV orchestration 1906. An inter connection of services and processes are implemented within a leaf spine fabric 1908 using a network of white boxes 1910 that comprise various types of generic network components that are interconnected via an SDN enabled fabric 1912. In SDN and FNV, the defined control structure enables the white boxes 1910 to be utilized in a desired manner or even repurposed in order to provide the virtualized network.

Figure 26:
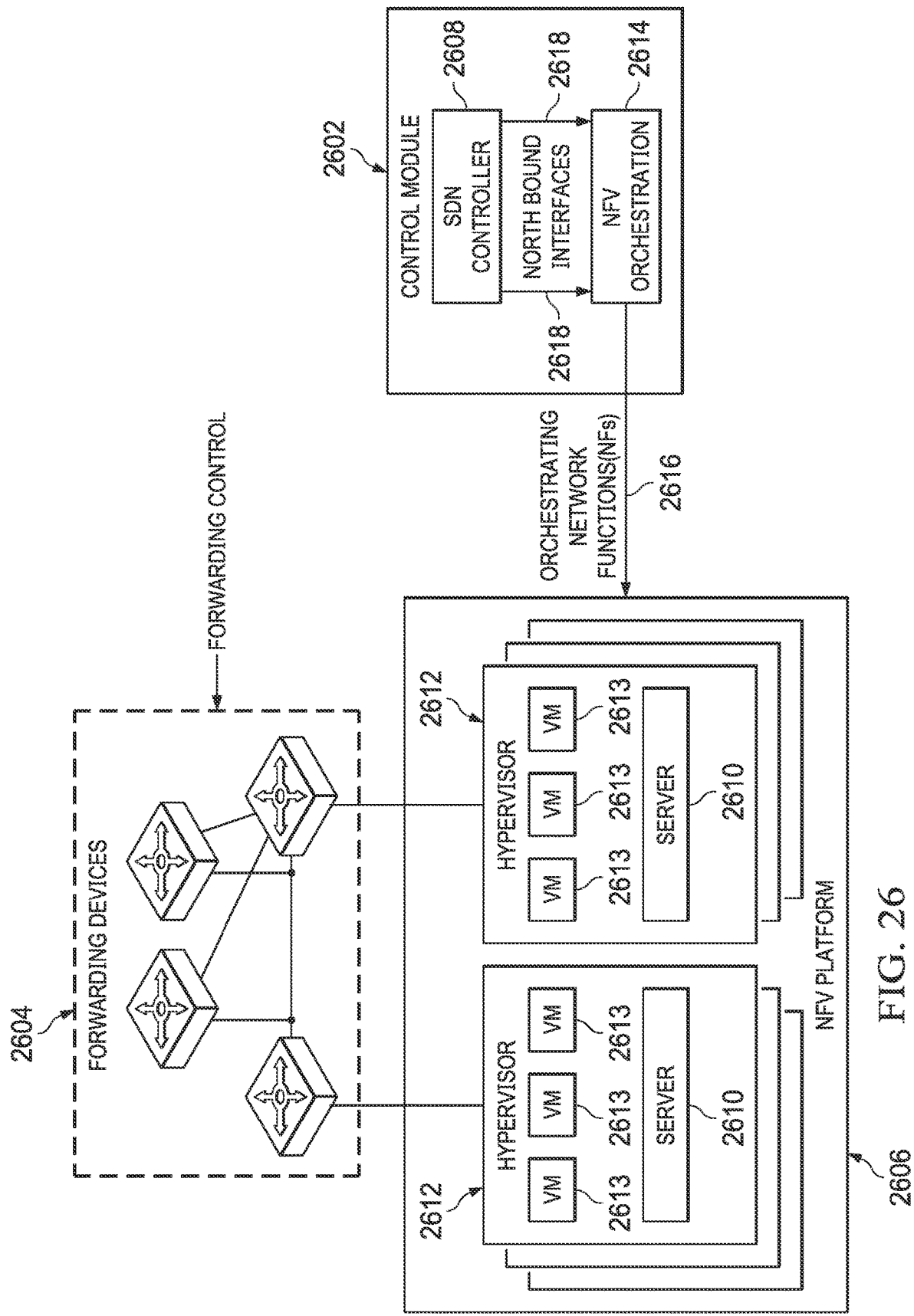
FIG. 26 illustrates a software defined network function virtualization system.

Virtualization of the central office enables the use of mobile edge services. Referring now to FIG. 26, there is illustrated the manner in which traditional mobile services are provided to a user device 2602. In this case, a centralized core 2604 transmits all traffic over a network 2606 connecting the centralized core 2604 to the user device 2602. Within traditional mobile service architecture all services are processed at the central core 2604. This requires overloading of the backhaul transport and core EPC. This provides for an inefficient use of network resources and causes a deterioration of the quality of experience of users. This type of implementation can also lead to over provisioning in order to handle peak traffic hours.

Figure 21:
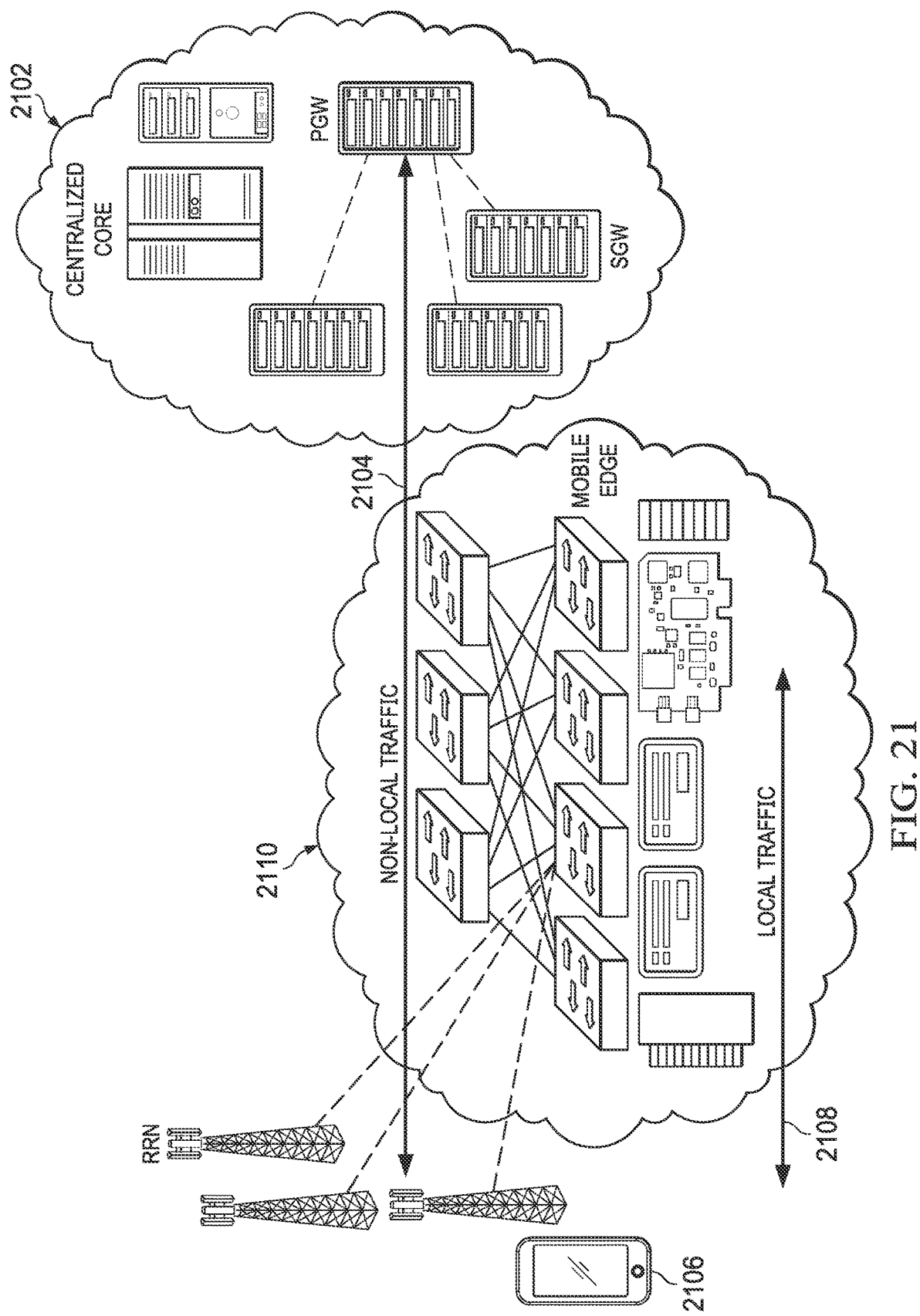
FIG. 21 illustrates a mobile edge computing services system.

FIG. 21 illustrates a mobile edge computing services system wherein the centralized core 2102 communicates only nonlocal traffic 2104 with the user device 2106. With respect to local traffic 2108, a mobile edge network 2110 is used for calculations and determinations in order to locate the processing and communications locally and more closely to the user device 2106. Services that can be processed at the edge network 2110 use M-CORD (mobile central office to data center) systems. Mobile edge services provide the advantage of being proximately located to end users. Mobile edge services provides for innovative and customized services that target customers (Internet of things, smart cities, education, industrial M2M, etc.) mobile edge services provide better efficiencies and new revenue opportunities for system operators.

Thus, CORD has emerged as an important service provider solution platform that brings the economy of the data center and the agility of a cloud. M-CORD integrates disaggregated/virtualized RIN and EPC with mobile edge services into CORD. M-CORD includes the integration of disaggregated eNB and provides connectionless service for Internet of things use cases.

MPEG-DASH is an ISO open standard for the adaptive delivery of segmented control (dynamic adaptive streaming over HTTP). Dash-Based compression in the mobile edge provides for bit rate trimming, bandwidth minimization, low latency options, HTTP delivery and improve throughput. The key differentiator of DASH, as opposed to any of the other HTTP streaming formats, is its open standard configuration.

Figure 22:
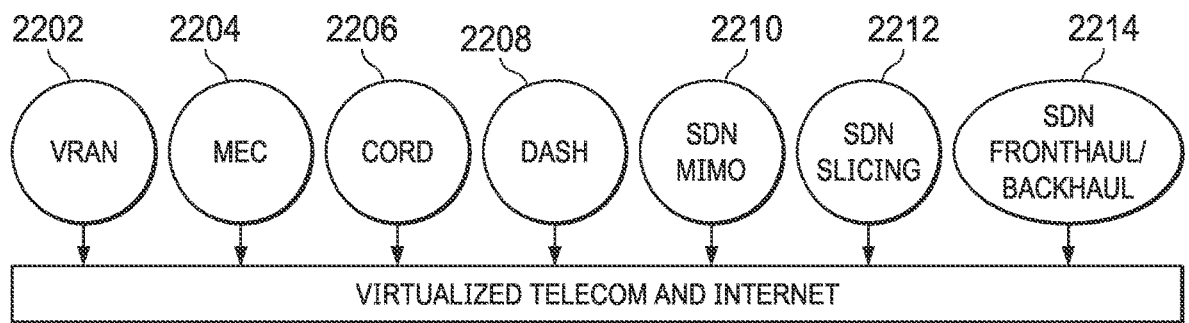
FIG. 22 illustrates the manner for creating a virtualized cloud architecture for telecom and Internet.

Thus, referring now to FIG. 22, by using a cloud native architecture (for example 5G architecture) various combinations of one or more of virtual radio access networks (VRAN) 2202, mobile edge computing (MEC) services 2204, CORD 2206, Dash-based compression 2208, SDN-based massive MIMO 2210, SDN-based end-to-end network slicing with massive MIMO 2212 to optimize the quality of experience for a given application on a same infrastructure, and SDN-based backhaul/fronthaul 2214 ultrabroadband virtualized telecom and internet services 2216 may be provided.

Software-Defined Networks and Network Function Virtualization

Figure 23:
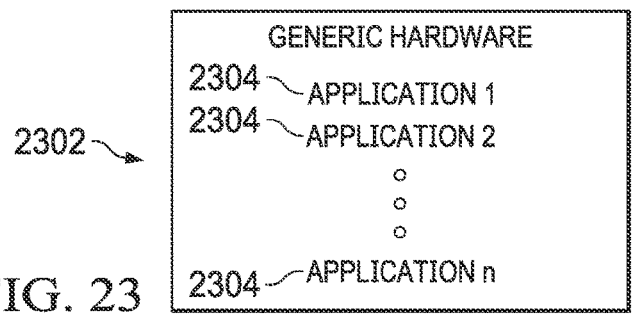
FIG. 23 illustrates a network function virtualization.

Diverse proprietary network hardware boxes increase both the capital and operational expense of service providers while causing problems of network management. Network function virtualization (NFV) addresses these issues by implementing network functions as pure software on commodity and generic hardware. Thus, as shown in FIG. 23, a generic off-the-shelf hardware 2302 may be used to generate a variety of system applications 2304 that are programmed into the hardware. NFV allows flexible provisioning, deployment, and centralized management of virtual network functions. Integrated with Software Defined Networks (SDN), the software-defined NFV architecture further offers agile traffic steering and joint optimization of network functions and resources. This architecture benefits a wide range of applications (e.g., service chaining) and is becoming the dominant form of NFV. Herein below, we introduce development of NFV under the software-defined NFV architecture, with an emphasis on service chaining as its application to Backhaul, Fronthaul and last mile wireless Internet Access. The software-defined NFV architecture is introduced as the state of the art of NFV and presents relationships between NFV and SDN. Finally, significant challenges and relevant solutions of NFV are described and its application domains (i.e. BH/FH/Access) are discussed.

Current network services rely on proprietary boxes and different network devices that are diverse and purpose-built. This situation induces network management problems, which prevent the operation of service additions and network upgrades (ossification). To address this issue and reduce capital expenditures (CapEx) and operating expenditures (OpEx), virtualization has emerged as an approach to decouple the software from the supported hardware and allow network services to be implemented as software. ETSI proposed Network Functions Virtualization (NFV) to virtualize the network functions that were previously carried out by some proprietary dedicated hardware. By decoupling the network functions from the proprietary hardware boxes, NFV provides flexible provisioning of software-based network functionalities on top of an optimally shared physical infrastructure. It addresses the problems of operational costs of managing and controlling these closed and proprietary boxes by leveraging low cost commodity servers.

On the other hand, with the development of Software Defined Networking (SDN), the trend is to integrate SDN with NFV to achieve various network control and management goals (i.e. dynamic resource management and intelligent service orchestration). Through NFV, SDN is able to create a virtual service environment dynamically for a specific type of service chain, consequently the dedicated hardware and complex labor work to provide a new coming service request is avoided. In conjunction with the use of SDN, NFV further enables real-time and dynamic function provisioning along with flexible traffic forwarding.

Software-defined NFV leverages network virtualization and logically centralized intelligence to minimize the service providing cost and maximize the utilization of network resources. In this case, the obtained higher resource utilization will introduce less investigation on the hardware equipment, which on the other hand simplifies networking operations. Moreover, by automating current manually intensive network configuration, provisioning, and management, the time and operational complexity are significantly reduced and manual errors are dramatically decreased, which offers better scalability. On the other hand, especially in large scale networks, deploying and providing a new kind of service usually results in a long and repeated process that requires long cycles of validation and testing. By automating the control, management and orchestration, the deployment time and operation cost will be significantly reduced.

Service chaining is the main area of software-defined NFV. In current networks, a service chain includes a set of hardware dedicated network boxes offering services such as load balancers, firewall, Deep Packet Inspection (DPI), Intrusion Detection System (IDS), etc., to support a dedicated application. When a new service requirement is added, new hardware devices must be deployed, installed and connected, which is extremely time-consuming, complex, high-cost and error-prone. This kind of networking service requires a dedicate plan of networking changes and outages, which requires high OpEx. On the other hand, the architecture of software-defined NFV is able to simplify the service chain deployment and provisioning. It enables easier and cheaper service provisioning in the local area networks, enterprise networks, data center and Internet service provider networks, wireless operator networks and their backhaul, fronthaul and last mile access networks.

The following introduces the state-of-the-art of NFV and its main challenges within the software-defined NFV architecture. Service chaining is highlighted and discussed as a core application of NFV in different contexts. Guidelines are provided for developments of NFV in various applications to backhaul, fronthaul and last mile access.

Software-Defined Network Function Virtualization

To reduce CapEx and OpEx introduced by diverse proprietary hardware boxes, NFV exploits and takes advantage of the virtualization technology. NFV allows network operators and service providers to implement network functions in software, leveraging standard servers and virtualization technologies, instead of purpose-built hardware. Recent trends of increased user information demands, explosion of traffic and diverse service requirements further drive NFV to be integrated with SDN, forming the software-defined NFV architecture. This architecture offers great flexibility, programmability and automation to the operators in service provisioning and service modeling.

Diverse and fixed proprietary boxes make the service, deployment and testing of new systems increasingly difficult. NFV is a key technology to benefit IT virtualization evolution by separating the hardware network functions from the underlying hardware boxes by transferring network functions from dedicated hardware to general software running on commercial off-the-shelf (COTS) equipment, i.e., virtual machines (VMS). These software applications are running on standard IT platforms like high-performance switches, service, and storage. Using NFV, the different network functions can be deployed in different locations of the networks such as data centers, network nodes, and end-nodes of a network edge as required. Currently, the market of NFV includes switching elements, network elements, network services and applications. A summary of these include:

Network switching elements, i.e., Broadband Network Gateway (BNG), carrier grade NAT, Broadband remote access server (BRAS), and routers.

Mobile network devices, i.e., Home Location Register/Home Subscriber Server (HLR/HSS), Serving GPRS Support NodeMobility Management Entity (SG-SNMME), Gateway support node/Packet Data Network Gateway (GGSN/PDN-GW), RNC, NodeB and Evolved Node B (eNodeB) such as that disclosed in T. Wu, L. Rui, A. Xiong, and S. Guo, "An automation PCI allocation method for eNodeB and home eNodeB cell," in *Proc. IEEE 6th Int. Conf. Wireless Commun. Netw. Mobile Comput. (WiCOM)*, September 2010, pp. 1-4, which is incorporated herein by reference in its entirety.

Virtualized home environments as described in A. Berl, H. de Meer, H. Hlavacs, and T. Treutner, "Virtualization in energy-efficient future home environments," *IEEE Commun. Mag.*, vol. 47, no. 12, pp. 62-67, December 2009 and R. Mortier et al., "Control and understanding: Owning your home net-work," in *Proc. IEEE 4th Int. Conf. Commun. Syst. Netw. (COMSNETS)*, January 2012, pp. 1-10, each of which are incorporated herein by reference in its entirety.

Tunneling gateway devices, i.e., IPSec/SSL virtual private network gateways.

Traffic analysis elements, i.e., Deep Packet Inspection (DPI), Quality of Experience (QoE) measurement.

Service Assurance, Service Level Agreement (SLA) monitoring, Test and Diagnostics such as that described in H. Ludwig et al., "Web service level agreement (WSLA) language specification," IBM Corp., New York, NY, USA, Tech. Rep., 2003, pp. 815-824, which is incorporated herein by reference.

Next-Generation Networks (NGN) signaling such as Session Border Controller (SBCs), IP Multimedia Subsystem (IMS).

Application-level optimization devices, i.e., Content Delivery Network (CDNs), load balancers, cache nodes, and application accelerators such as that described in F. T. Leighton and D. M. Lewin, "Content delivery network using edge-of-network servers for providing content delivery to a set of participating content providers," U.S. Pat. No. 6,553,413, Apr. 22, 2003, which is incorporated herein by reference in its entirety.

Network security devices, i.e., Firewalls, intrusion detection systems, DOS attack detector, virus scanners, spam protection, etc. such as that described in E. D. Zwicky, S. Cooper, and D. B. Chapman, Building Internet Firewalls, Sebastopol, CA, USA: O'Reilly Media, 2000, which is incorporated herein by reference in its entirety.

The major advantage of using NFV is to reduce middle dedicated hardware boxes deployed in the traditional networks to take the advantages of cost savings and bring flexibility. On the other side, NFV technology also supports the co-existence of multi-tenancy of network and service functions, through allowing the usage of one physical platform for different services, applications and tenants.

NFV Framework

Figure 24:
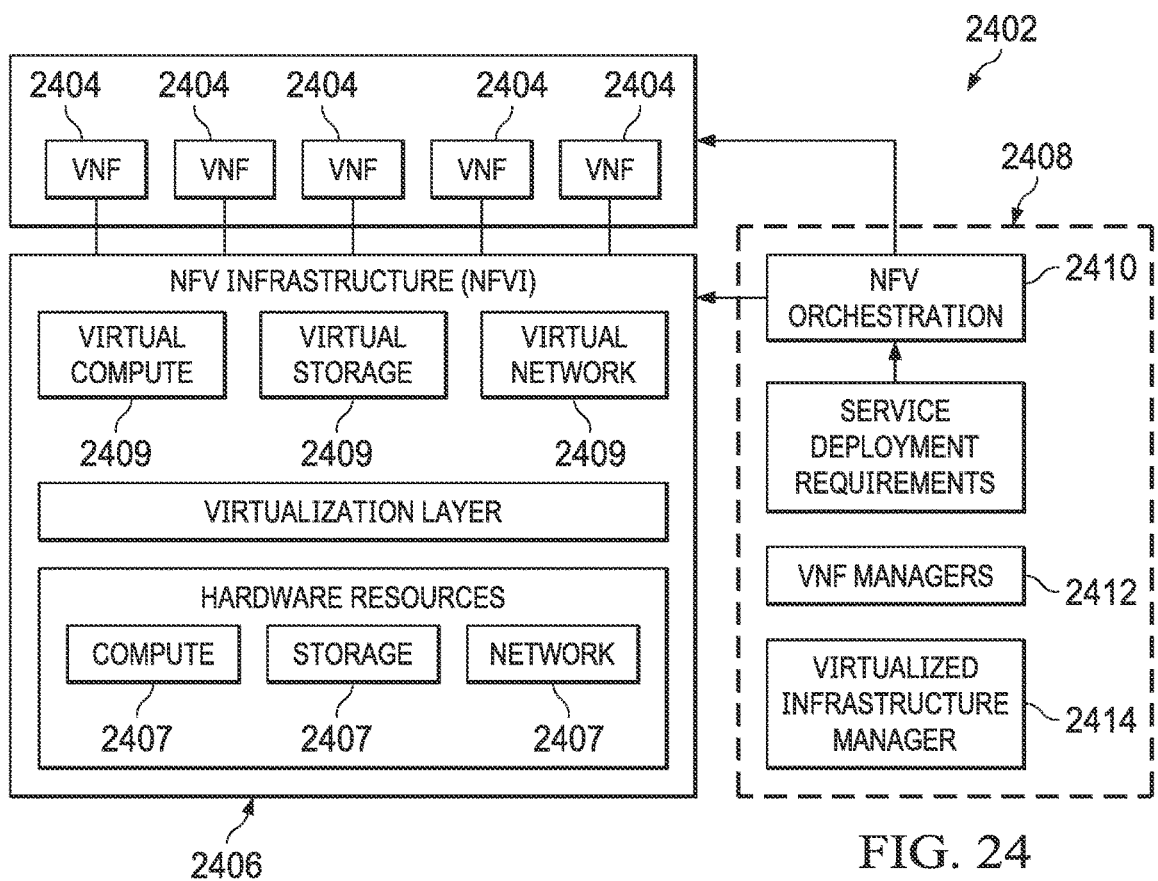
FIG. 24 illustrates a network function virtualization architectural framework.

ETSI defines the NFV architectural framework 2402 as illustrated in FIG. 24 enabling virtualized network functions (VNF) 2404 to be deployed and executed on a Network Functions Virtualization Infrastructure (NFVI) 2406, which consists of commodity servers 2407 to provide computing, storage and network functionalities wrapped with a software layer that logically partitions them. Above the hypervisor layer, a VNF 2404 is typically mapped to one VM (virtual machine) 2409 in the NFVI. The deployment, execution and operation of VNFs 2404 on the NFVI 2406 are steered by a Management and Orchestration (M&O) system 2408, whose behavior is driven by a set of metadata describing the characteristics of the network services and their constituent VNFs. The M&O system includes an NFV Orchestrator 2410 in charge of the lifecycle of network services, a set of VNF managers 2412 in charge of the life cycle of the VNFs and a virtualized infrastructure manager 2414, which can be viewed as an extended cloud management system responsible for controlling and managing NFVI resources.

Software-Defined Networks

A Software-Defined Network (SDN) is an important and recently emerging network architecture to decouple the network control from the data forwarding. With its inherent decoupling of the control plane from the data plane, SDN offers a greater control of a network through programming. This combined feature would bring potential benefits of enhanced configuration, improved performance, and encourages innovation in network architecture and operations. Especially, SDN offers a promising alternative for traffic steering by programmatically configuring forwarding rules as described in N. Handigol, S. Seetharaman, M. Flajslik, N. McKeown, and R. Johari, "Plug-n-serve: Load-balancing Web traffic using OpenFlow," in Proc. ACM SIGCOMM Demo, 2009, pp. 1-2, which is incorporated herein by reference in its entirety.

Figure 25:
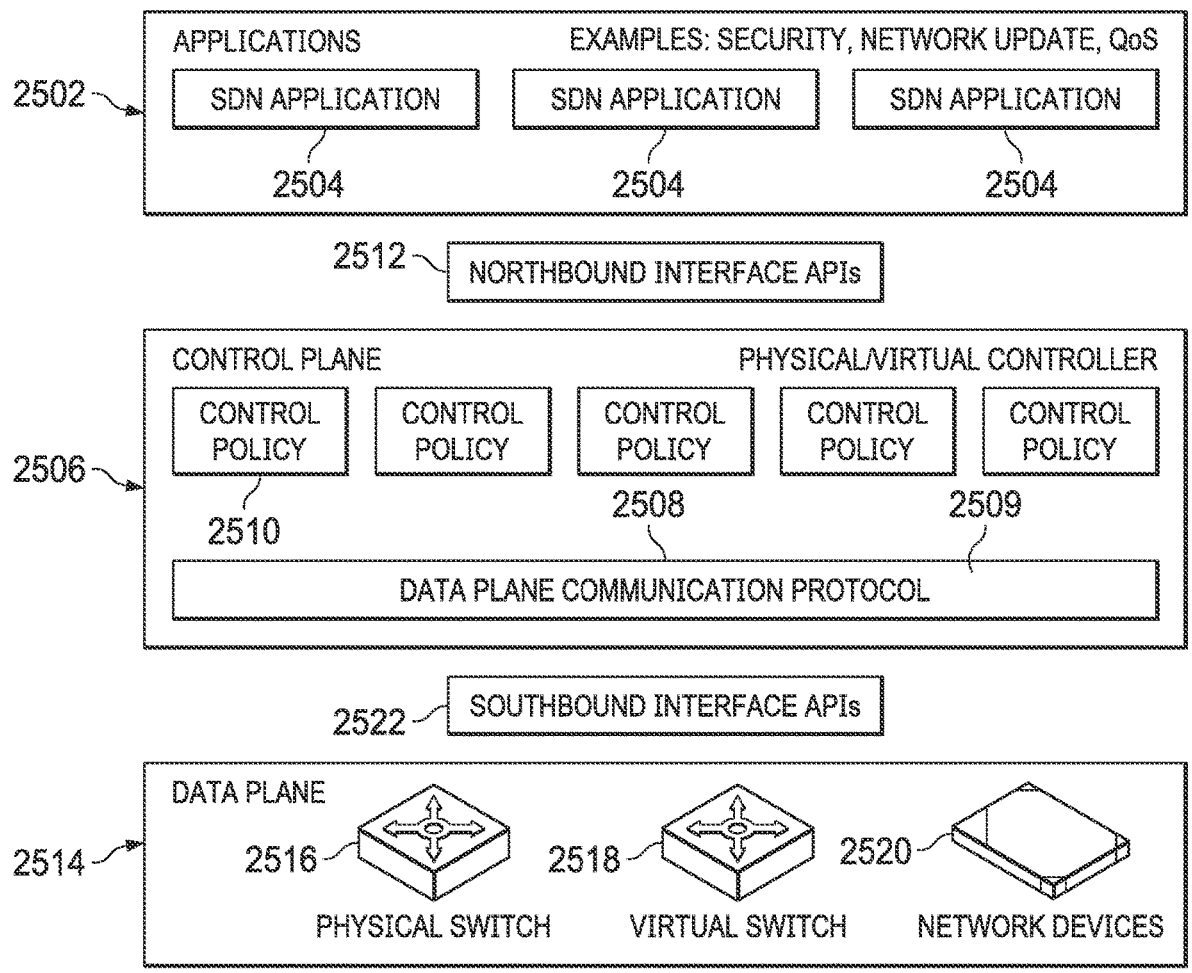
FIG. 25 illustrates software defined network architecture.

FIG. 25 depicts the SDN architecture. There are three different layers. The application layer 2502 covers an array of applications 2504 focusing on network services, and they are mainly software applications communicating with the control layer 2506. As the core of SDN, the control layer 2506 consists of a centralized controller 2508, which logically maintains a global and dynamic network view, takes requests from the application layer 2502, and manages the network devices via standard protocols 2509 using control policies 2510. Communications between the applications layer 2502 and the control layer 2506 occur through application program interfaces 2512. The data-plane layer 2514 provides infrastructure including switches, routers and network appliances through physical switches 2516, virtual switches 2518 and network devices 2520. In an SDN context, these devices are programmable and support standard interfaces. Communications between the control layer 2506 and the data plane layer 2514 occur via application program interfaces 2522.

The application layer 2502 utilizes the northbound APIs 2512 to communicate with the SDN controller 2506 (Control Plane Layer), which enable different control mechanisms for the networks. The southbound APIs 2522 define the communication interface between the controller layer 2506 and data plane devices within the data plane layer 2514, which enable the application to control the forwarding device is a flexible and programmable manner.

NFV Versus SDN

NFV and SDN are closely related and highly complementary to each other. NFV can serve SDN by virtualizing the SDN controller 2506 (which can be regarded as a network function) to run on the cloud, thus allows dynamic migration of the controllers to the optimal locations. In turn, SDN serves NFV by providing programmable network connectivity between virtual network functions (VNFs) to achieve optimized traffic engineering and steering. However, NFV and SDN are completely different from the concepts to the system architecture and functions, which are summarized by the following aspects.

Figure 20:
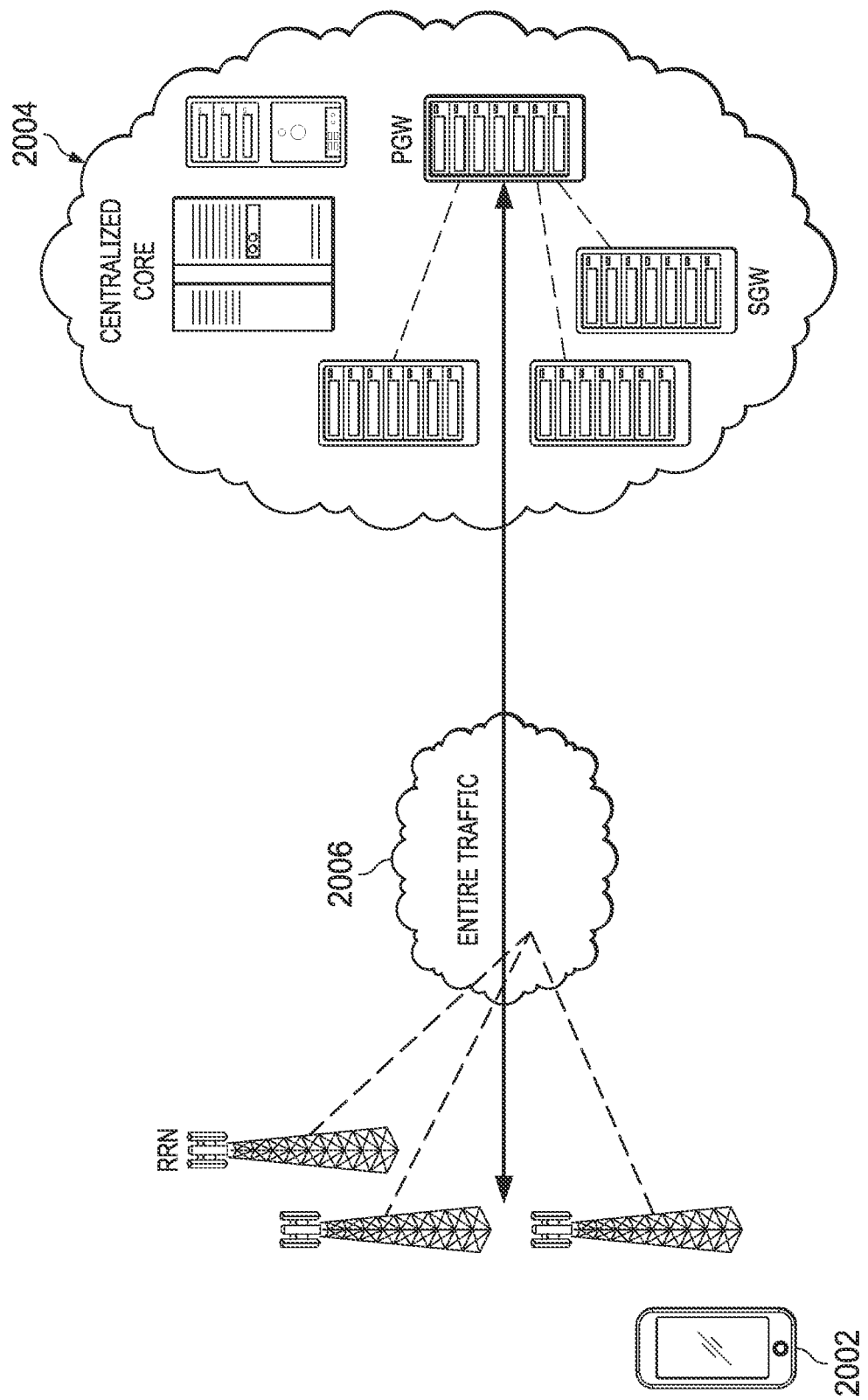
FIG. 20 illustrates the manner in which traditional mobile services are provided to a user device.

NFV is a concept of implementing network functions in software manner, while SDN is concept of achieving centrally controlled and programmable network architecture to provide better connectivity. NFV aims at reducing CapEx, OpEx, and space and power consumption, while SDN aims at providing network abstractions to enable flexible network control, configuration and fast innovation. NFV decouples the network functions from the proprietary hardware to achieve agile provisioning and deployment, while SDN decouples the network control plane from the data Software-Defined NFV Architecture The software-defined NFV system is illustrated in FIG. 20. The system consists of a control module 2002, forwarding devices 2004 and NFV platform 2006 at the edge of the network. The logic of packet forwarding is determined by the SDN controller 2008 and is implemented in the forwarding devices 2004 through forwarding tables. Efficient protocols, e.g., OpenFlow, can be utilized as standardized interfaces in communicating between the centralized controller 2002 and distributed forwarding devices 2004. The NFV platform 2006 leverages commodity servers 2010 to implement high bandwidth NFs (network functions) at low cost. Hypervisors 2012 run on the servers 2010 to support the VMs 2013 that implement the NFs. This platform 2006 allows customizable and programmable data plane processing functions such as middle box of firewalls, IDSs, proxies, which are running as software within virtual machines, where NFs are delivered to the network operator as pieces of pure software.

Figure 27:
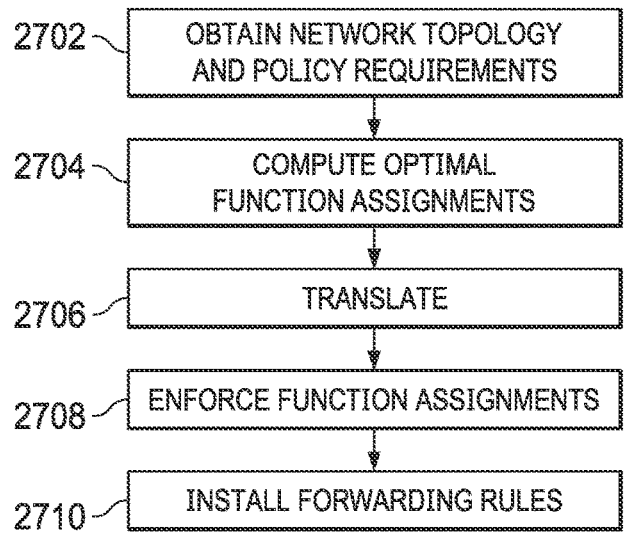
FIG. 27 illustrates a flow diagram describing a process for provisioning functions.

The SDN controller 2008 and the NFV orchestration system 2014 compose the logical control module 2002. The NFV orchestration system 2014 is in charge of provisioning for virtualized network functions 2016, and is controlled by the SDN controller 2008 through standard interfaces 2018. Referring now to FIG. 27, there is illustrated a process for provisioning functions. After obtaining the network topology and policy requirements at step 2702, the control module 2008 computes the optimal function assignments (assigning network functions to certain VMs) at step 2704 and translates at step 2706 the logic policy specifications into optimized routing paths. The function assignments are enforced at step 2708 by the NFV orchestration system 2014, and the controller 2008 steers the traffic traveling through the required and appropriate sequence of VMs 2013 and forwarding devices 2004 by installing forwarding rules into them at step 2710.

From Middle Box to NFV

Though NFV is not limited to virtualizing middle boxes, the concept of NFV was initiated in the context of middle box. The present disclosure introduces the evolution from a traditional purpose-built middle box to NFV, during which consolidated middle box and software-defined middle box act as transitional paradigms.

Middlebox Overview

A middle box is a networking forwarding or processing device that transmits, transforms, filters, inspects or controls network traffic for purposes of network control and management. A middle box service or function is a method or operation performed by a network device that needs specific intelligence about the applications. Typical examples of middle boxes include network address translators (NATs) that modify packet's destination and source addresses, and firewalls that filter unwanted or malicious traffic. The following are commonly deployed middle boxes:

| | |
|---|---|
| 1) | Network Address Translator (NAT) |
| 2) | Firewall (FW) |
| 3) | Intrusion Detection System (IDS) |
| 4) | Load Balancer (LB) |
| 5) | WAN Optimizer |
| 6) | Flow Monitor (FM) |

Consolidated Middlebox

Here, an overview for the efforts on consolidating middle boxes is provided, which are precursors to the current NFV paradigm.

| | |
|---|---|
| 1) | CoMb |
| 2) | APLOMB |
| 3) | Integrate Middle Boxes into Network |

Software-Defined Middlebox

As SDN evolves, the principles of abstracting the architecture layer of network from the control plane 2506 and data plane 2514 have been investigated in various contexts. This idea introduces some unique opportunities for the development of middle boxes. Inspired by the idea of SDN, some researchers proposed a software-defined middle box and corresponding networking architecture, with the aim of providing fine-grained and programmable control over the middle box state and network forwarding.

Service Chaining

Service chaining is an important model for network service providers, in which NFV plays an important role. It is utilized to organize the service function deployment, where the ability of specifying an ordered list of service processing for the service's traffic flows is provided. A service chain defines the required processing or functions and the corresponding order that should be applied to the data flow. These chains require the integration of service policy and the above applications to achieve optimal resource utilization.

Traditional service chaining mainly relies on manual configuration which is tedious, error-prone and clumsy. SDN provides new capabilities to steer traffic dynamically based on user requirements. However, hardware-based middle boxes limit the benefit of SDN due to their fixed functionalities and deployment. NFV is a good enabler for SDN. With the ability of dynamic function provisioning offered by NFV and the centralized control of SDN, new opportunities emerged in service chaining. Better performance and resource utilization can be achieved with the software-defined NFV architecture.

SDN & Middle Box Based Service Chaining

SDN offers the flexible control approach and enables dynamic traffic forwarding, and this style of traffic control for middle box-specific flow can realize flexible and efficient service chaining with no need to generate any placement or introduce some constraints on middle boxes, which are on the other hand easily supported by current SDN standards. The following are some of the important functions:

| | | |
|---|---|---|
| 1) | | Symple |
| 2) | | Steering |
| 3) | | Flowtag |

Service Chaining in the Software-Defined NFV Architecture

SDN and NFV together have the potential to benefit service operators, satisfy user service level agreements and accurately monitor and control network traffic, which further reduces and minimizes the operating cost. On one hand, NFV moves network functions out of dedicated hardware boxes to the software based on general hardware platform. SDN moves control functions out of the hardware and places it in the software controller. Therefore, the service deployment and service chains can be provided and reconfigured in the controller. In this way, not only flexible and dynamic operations are allowed, the chance for operation error and events will be much smaller because the network controller has an overall view, which reduces the probability of inconsistent configurations.

Moving the required network functions into software means that deploying the service chain no longer requires acquiring a dedicated middle box. In this case, the network functions execute as the software running on virtual machines with the control of a hypervisor 2012, which enable flexible computational and networking resource provisioning. Thus, since the computational capacity can be increased when required, there's no need to over-provision. On the other hand, software-defined NFV service chaining also helps the network upgrade process. For geographically distributed networks, upgrading network devices is costly. Moreover, the errors in the network updates and re-configuration can bring down the entire network. However, with the software-defined NFV, service providers are able to create new chains without radically changing hardware. Finally, service operator can utilize these service chaining techniques by themselves, instead of using third party providers. With intelligent service chaining, complexity of resource provisioning is significantly reduced. Thus, service providers can deliver services on demand without the help of third parties.

Figure 28:
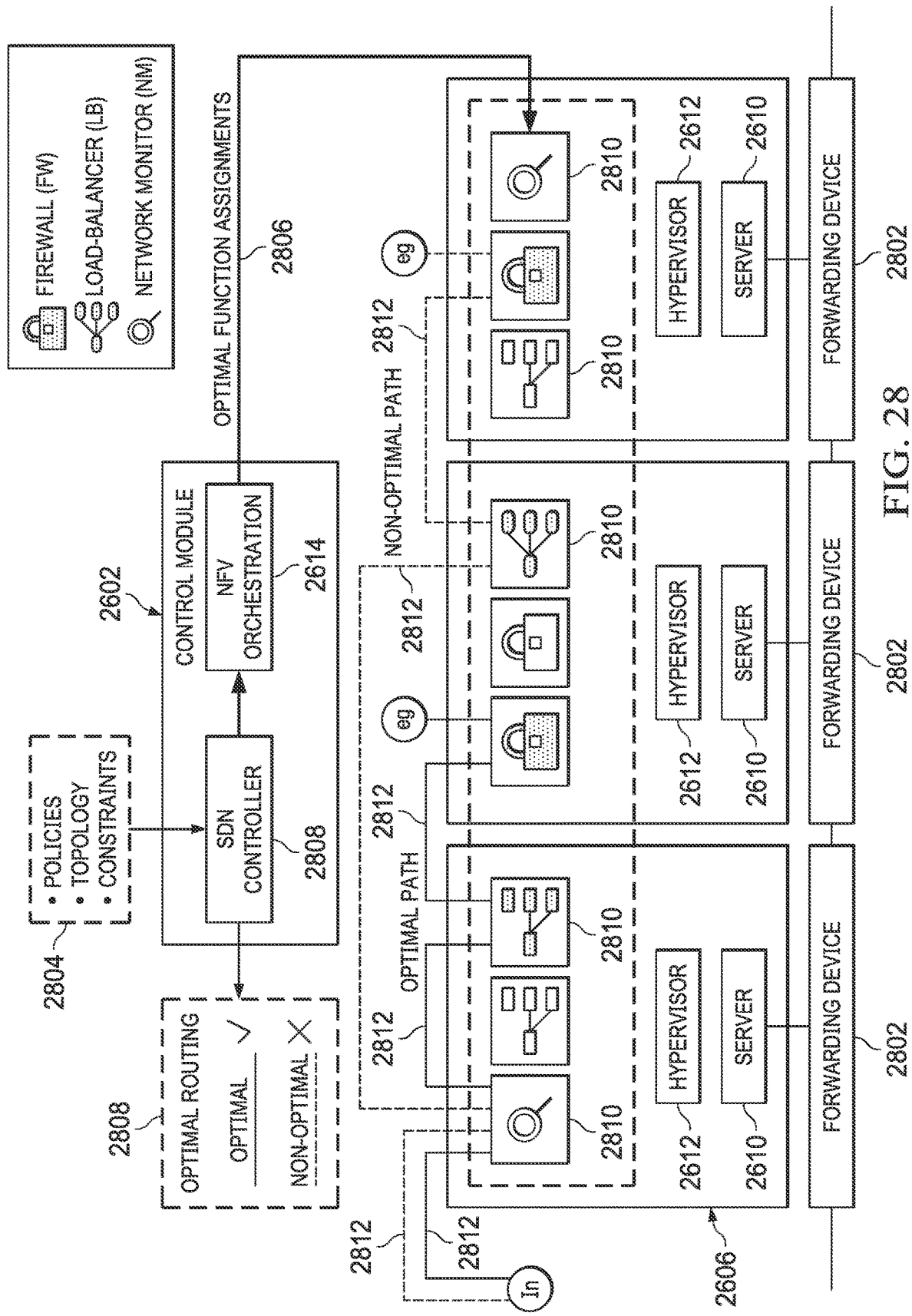
FIG. 28 illustrates an example of a service chaining process.

FIG. 28 illustrates an example of the service chaining process. Within a software-defined NFV architecture, a unified control and orchestration framework 2002 is required to integrate the SDN controller 2008, forwarding elements 2802 and virtual network functions 2073. Moreover, due to the existence of dynamic function and resource provisioning, this framework should also provide coordinated control of both network forwarding state and network functions states. Taking user policies 2804 as inputs, the control module 2002 assigns the NFs 2806 fulfilling these services in an optimal way and meanwhile the optimal routing paths 2808 of all policies are selected taking account of the resource constraints. The service functions 2810 are then chained by the centralized controller and the traffic flows 2812 are steered according to the service chains.

Challenges and Problems of Network Function Virtualization

NFV is an important innovation and a promising approach for the service operators and providers. However, it also faces several challenges. Here the corresponding challenges, open problems, and related solutions are summarized with the classifications organized in Table 1.

Function Virtualization

The virtualized functions should meet performance requirements to support packet processing at line-rate for multiple tenants. First, since neither the hypervisors 2012 nor the virtual machines 2073 have been optimized for the processing of the middle box, obtaining high performance, i.e., high I/O speed, fast packet processing, short transmission delays, etc. from standard servers is the main challenge for function virtualization. Further, as a server may implement a large amount of functionality, their platforms should host a wide range of virtual machine 2013 and software packages. Finally, NFV hardware and software platforms should support multi-tenancy, because they are concurrently run by software belonging to the different operators. These co-located VNFs 1804 should be isolated not only from a security but also a performance point of view. Here is a summary of some important related works on function virtualization.

1) DPDK is a set of libraries and drivers for fast packet processing for the network functions. DPDK can be run on a wide range of processors. However, the DPDK system has some limitation to support virtualization as it cannot support flexible, high performance functionality in the NFV environment.

2) NetVM is a software platform for running diversity network functionality at line-speed based on the general commodity hardware. It takes advantage of DPDK's high throughput packet processing capabilities, and further enables flexible traffic steering and overcomes the performance limitations of hardware switching. Thus, NetVM provides the capability to support network function chains by flexible, high-performance network elements.

3) ClickOS is a high-performance, virtualized software network function platform. It provides small, quickly booting, and little delay virtual machines, and over one hundred of them can be concurrently run while guaranteeing performance on a general commodity server. To achieve high performance, ClickOS relies an extensive overhaul of Xen's I/O subsystem to speed up the networking process in middle boxes. ClickOS is proof that software solutions alone are enough to significantly speed up virtual machine processing, to the point where the remaining overheads are dwarfed by the ability to safely consolidate heterogeneous middle box processing onto the same hardware.

Portability

The NFV framework is expected to support the loading, executing and moving of VNFs 1804 across different but standard servers in multi-vendor environments. This capability is known as portability. These virtualized network functions defeat the portability goal and key benefits of NFV, namely the capability of multi-tenancy and resource isolation. The portability challenge is how to achieve high performance leveraging hardware accelerators and at the same time have hardware independent NFs. This approach ensures that the VNFs 1804 are OS-independent and resource isolation is also guaranteed since the VNFs 1804 are executed on independent VMs and are decoupled from the underlying OS by the hypervisor layer.

Standard Interfaces

NFV relies on existing infrastructure to touch the customer. In this case, it is also highly unlikely that an upgrade of the physical network or entire operational support systems will be feasible. This is a management software integration challenge with the interfaces between NFV and underlying infrastructure. On the other hand, the interfaces between the centralized controller and VNFs 1804 should also be standardized. To smoothly bridge NFV with upper and lower layers, the VNFs 1804 and the underlying computing platform should be described by standard templates that enable flexible control and management. Thus, north- and south-bound interface APIs 2512, 2522 need to be developed. North-bound interface 2512 interactions are used to control and manage functions to different types of instances, e.g., physical servers, VM 2013 and VNFs 1804. Since network functions need service-oriented APIs to be controlled directly or indirectly, each network service has a specific operation policy and SLA. Moreover, VNFs 1804 could use the north-bound API 2512 for the requests. On the other hand, the south-bound APIs 2522 are utilized to communicate with the NFVI 1806 and request information from other framework entities. Thus, how to design a flexible and efficient API for both the north-bound and south-bound communications are important problems in the research and development of NFV technologies.

Function Deployment

Fine-grained deployment, control and management of network functions are needed in the context of NFV-enabled network nodes, for various optimization purposes. Thus, many challenges are related to algorithm and system design of function deployment.

One of these challenges is to automatically provide network and function process resources according to the usage of the resources involved. A similar and probably even more important challenge is to achieve automatic placement and allocation of the VNFs 1804, since the placement and assignment of the VNFs 1804 significantly impact the performance of service chaining. Both automated provisioning and placement require a global view of the resources and a unified control and optimization system with various optimization engines running in it. Another issue is to translate higher-level policies, which are generated from the resource allocation and optimization mechanisms, into lower level configurations. Templates and standards should be developed to guarantee automated and consistent translation. For example, when there is a need to achieve a high-level goal of reducing the networking transmission delay, the optimization engine may require an algorithm to provision and place virtual functions ensuring that the least overall transmission delay is achieved. Conversely, when it is required to achieve the minimum or maximum link utilization, it would need a different optimization engine with a different algorithm. For more effective operation and control, the optimization approach should support real-time swap to make provisioning and placements that dynamically match the high-level policies from the operator and application.

Traffic Steering

SDN offers the new agility of traffic steering by allowing the network operators and service providers to specify a logical control policy, and then automatically translates this into data plane 2514 forwarding rules. Prior to this, the routing paths are carefully selected by the optimization framework taking into account the physical topology, link capacities, and network resource constraints. Solid work has been done on traffic steering in hardware based middle box systems. However, in the software-defined NFV architecture, traffic steering is jointly optimized with NFV deployment that can achieve better composition. However, the unified optimization paradigm also makes the optimization problem difficult to solve since more variables are introduced. To achieve online computing of traffic steering, heuristic algorithms should be designed to reduce the computing complexity.

TABLE 1

| Challenges | Description | Solution |
| --- | --- | --- |
| Function Virtualization | Virtualized functions should meet certain requirements to support packet processing at line-rate:<br>(1) High performance (high I/O speed, fast packet processing, short transmission delays, etc.)<br>(2) Support multi-tenancy<br>(3) OS-independent | Important related works:<br>(1) DPDK, a set of libraries for fast packet processing.<br>(2) NetVM, a system for miming network functionality and middlebox at line-speed in general commodity hardware.<br>(3) ClickOS, a small, quick-boot, low-delay, virtualized software middlebox platform. |
| Portability | The NFV framework is expected to load, execute and move VNFs across different but standard servers in multi-vendor environments. This capability is known as portability. | Deploying network functions via a virtual software environment enhances the portability. This approach ensures that the VNFs are OS-independent and resource isolation is also guaranteed. |
| Standard Interfaces | Standardized API should be developed to enable NFV to reach the customers via underlying infrastructure and to be centrally controlled and managed. | Both VNFs and computing resources are described via standard templates. Normalized north- and south-bound should be developed between these layers. |

TABLE 1-continued

| Challenges | Description | Solution |
| --- | --- | --- |
| Function Deployment | Fine-grained deployment, control and management of network functions, are needed in the context of NFV-enabled network nodes, for various optimization purposes. | A monitoring system collecting and reporting on the behavior of the resources, and a unified control and optimization system with various optimization engines should be developed. |
| Traffic Steering | In the software-defined NFV architecture, traffic steering should be jointly optimized with function deployment, making the optimization problem difficult to solve. | To achieve online computing of traffic steering, heuristic algorithms should be designed to reduce the computing complexity. |

Applications

Software-defined NFV technology is used for delivering significant benefits in niche applications today, while its full scale use and benefits have yet to be achieved. The following describes the major domains that will dominate the software-defined NFV scenario over next few years.

Cloud-Computing

Cloud computing enables globally distributed services and enterprises to quickly deploy, manage and optimize their computing infrastructure dynamically. Partitioning or replicating a service across multiple globally distributed instances allow these services to move closer to the users thus providing richer user experiences, avoid infrastructure bottlenecks, and implement fault tolerance.

NFV is an enabler of such dynamic service provisioning. By replacing service elements with virtual network functions, new functions can be added or improved by updating a software image, rather than waiting for a vendor to develop and manufacture a dedicated box. Furthermore, while integrated with SDN, service providers can express and enforce application traffic management policies and application delivery constraints at the required level of granularity.

NFV allows service providers to provide better services to the users by dynamically changing their deployment topologies or traffic allocations based on user access patterns, user consumption and mobility, infrastructure load characteristics, infrastructure failures and many such situations that may cause service degradation, disruption or churn. Similarly, replicated service instances might need to be moved/instantiated/released to mask infrastructure failures, load conditions, or optimize the deployment based on consumption patterns and social interaction graphs. NFV can also provide intelligent infrastructure support for such dynamic service deployment scenarios. Moreover, since NFV offers good support for multi-tenant usage, it is available for wide area dynamic multi-cloud environments that can be shared by multiple providers to implement their specific distributed service delivery contexts.

Below are summarized some important works trying to implement NFV in clouds:

| | |
| --- | --- |
| 1) | CloudNFV |
| 2) | THE REALTIME CLOUD |
| 3) | CLOUDBAND |

Mobile Network

NFV considers all network functions for virtualization through well-defined standards, i.e., in mobile network, NFV targets at virtualizing mobile core network and the mobile-network base station. NFV also benefits data centers owned by mobile service providers, including mobile core network, access networks and mobile cloud networks.

For the core networks, which are the most important part of mobile networks, NFV allows the cellular providers to adopt a network more akin to the data centers, which consist of simple forwarding devices 2604, with most functionality executed in commodity servers that are close to the base stations. Some network functions can even be fulfilled by packet-processing rules installed directly in the switches. In the system, a logically centralized controller is able to steer the network traffic through the required network functions to realize service chaining.

For the access networks, the base stations are being virtualized as well. Thus, SDN and NFV are applied to the wireless access networks to sharing their remote base station infrastructure to achieve better coverage and services with the minimum investment of CapEx and OpEx.

Enterprise Network

NFV is also being utilized in the enterprise network. Network managers would like to consume as much or as little of the network as they need, but there is a gap between what enterprise customers want and what service providers can offer today, which can be address by NFV. It enables the dynamic provisioning of virtual network services on commodity servers within minutes instead of months.

NFV for the enterprise will require their platform to become more comfortable embracing software L4-7 services, as well as changes in their operation models. An understanding of how to optimize performance with DPDKs, and potentially even looking at programmable hardware is critical. Another challenge is the time and process it takes to re-architect monolithic services that were predominantly deployed for north-south traffic.

A comprehensive overview of NFV within the software-defined NFV architecture is provided. NFV and its relationship with SDN has been introduced. The evolution of NFV has been reviewed and the discussion has covered how middle boxes evolved to virtual network functions. In particular, service chaining as a typical application of NFV has been described. Furthermore, software defined NFV challenges and possible solutions were covered. Next, a discussion of how to take the SDN and NFV concepts and leverage them in planning, designing and implementing a wireless backhaul, fronthaul and last mile access networks using standard based protocols as well as open source protocols will be provided.

Figure 29:
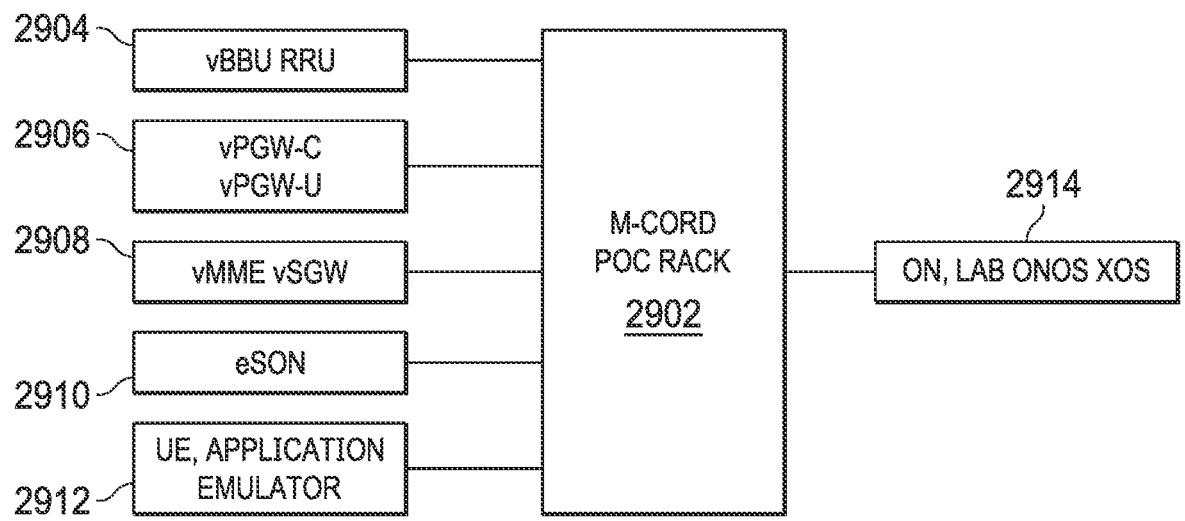
FIG. 29 illustrates an implementation approach for an SDR based massive MIMO system using a vRAN cloud architecture and SDN based network slicing.

Referring now to FIG. 29, there is illustrated an implementation approach for a SDR-based massive MIMO system using VRAN cloud architecture and SDN based network slicing. A M-CORD POC (power-on confidence) rack 2902 is used for storing system components. The rack 2902 may store virtual BBUs (baseband unit) and RRUs (radio remote units) 2904 for carrying out radio communications. The rack 2902 may also store virtual packet data network gateways 2906 including both vPGW-C and vPGW-U devices. The rack 2902 may also include virtual mobility management entitys (vMME) and virtual serving gateways (vSGW) at 2908. The rack 2902 may further include a self-organizing network (eSON) 2910 for controlling planning, configuration, management, optimization and healing of a mobile radio access network. Finally, a user equipment application emulator 2912 may be implemented within the rack 2902. The rack may also implement an open network operating system (ONOS) with XOS built on top of the ONOS at 2914. XOS comprises a service orchestration layer. ONOS manages scalable services running in a CORD. All of the components are implemented on commodity servers using OpenSource software.

The various flexible network functionalities implemented using SDN, NFV and cloud computing enables the provision of a scalable network using the various functionalities. Software defined networking (SDN) enables things such as access-as-a-service (ACCaas) to be implemented. ACCaaS is implemented by a vOLT (virtual optical line termination) control application running on ONOS and provides tenant abstraction that is equal to subscriber VLAN. SDN may also provide Internet as a service (INTaaS) that is implemented by a vBNG (virtual broadband network gateway) running on ONOS to provide a tenant abstraction that is equal to routable subnet (minimal placeholder). The network function virtualization can provide subscriber-as-a-service (SUBaaS) that is implemented by vCPE (virtual customer provided equipment) running in a Linux container that provides tenant abstraction equal to a subscriber bundle. The cloud computing may be used to provide a content distribution network (CDN) that is implemented by a distributed set of caches within the cloud this enables a tenant abstraction equal to a content provider.

Figure 30:
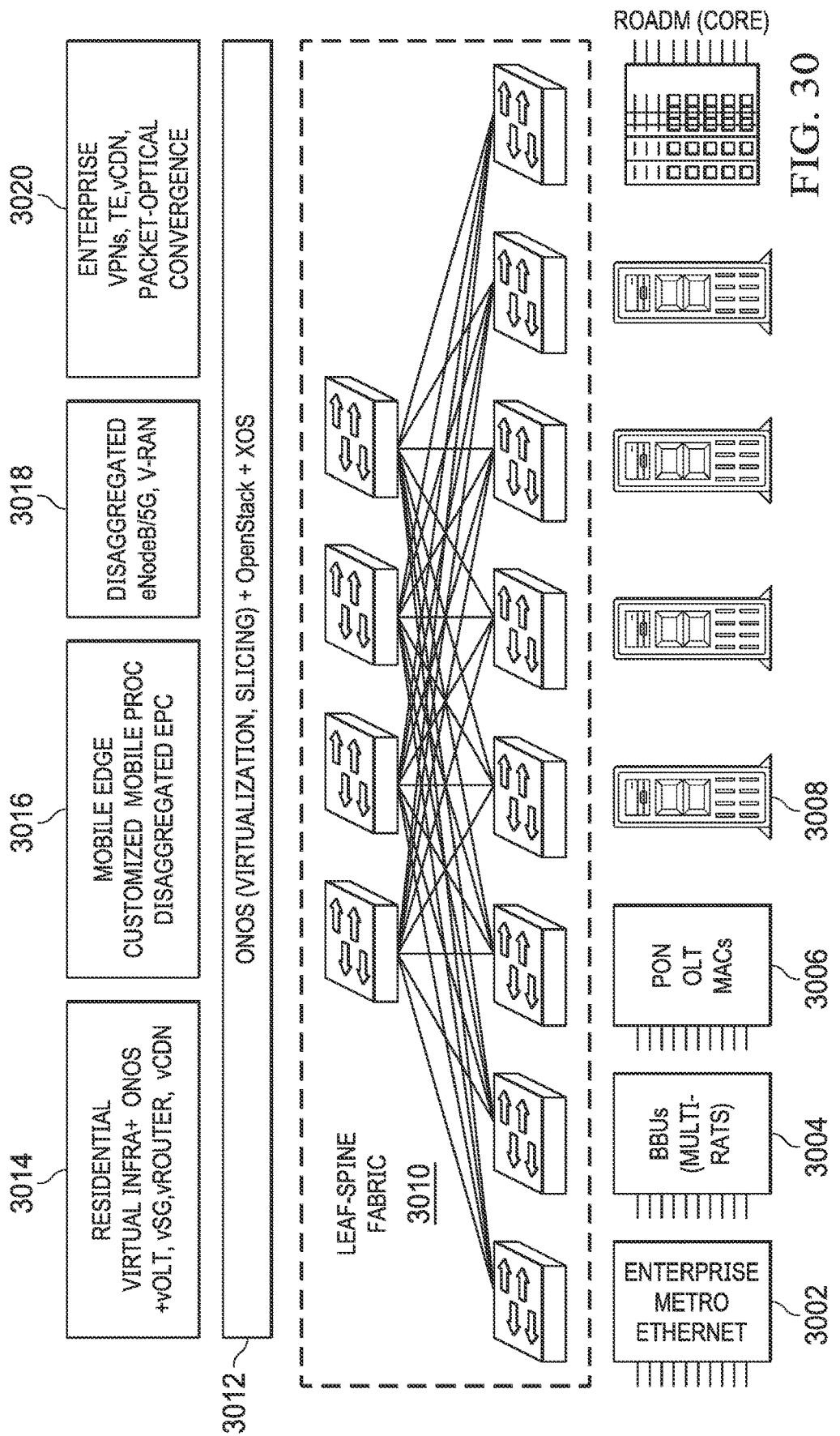
FIG. 30 illustrates a wireless embodiment of a network configured according to the above described system implementations.

Referring now to FIG. 30, there is illustrated one wireless network configuration according to the disclosed components with respect to use of commodity servers, storage, switches and input output devices. The wireless network is configured using commodity hardware and OpenSource software. The commodity hardware includes an enterprise Metro ethernet 3002; BBUs 3004; PONs (passive optical networks), OLT (optical line termination) and MACs (media access controllers) 3006; and various commodity servers 3008. These commodity devices are connected through a leaf-spine fabric 3010 that enables a layer 3012 implementing ONOS (open network operating system) that provides for network virtualization and slicing control as described hereinabove. The open network operating system also provides open stack and XOS. This configuration provides a number of applications such as residential applications 3014 that provides virtual infrastructure, ONOS, vOLT, vSG, vRouter (virtual router) and vCDN (virtual content delivery network). Mobile edge computing 3016 provides for customized mobile processing and disaggregated EPC (evolved packet core). Disaggregated eNodeB/5G and V-RAN 3018 control the radio connection to the user devices. Enterprise applications 3020 provide for VPNs (virtual private networks), TE, vCDN (virtual content delivery network) and convergence of packet-optical networks.

Figure 31:
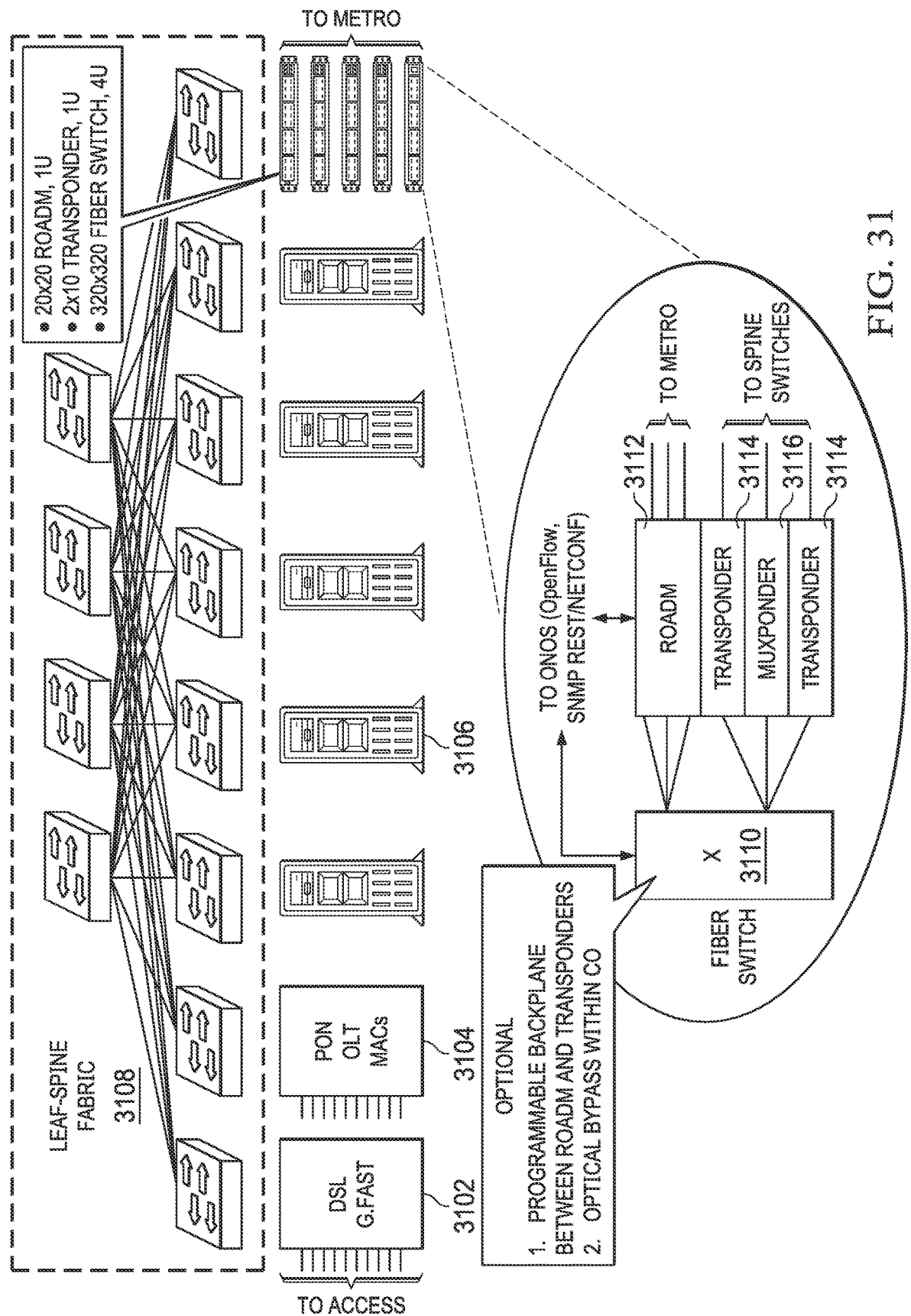
FIG. 31 illustrates a optical embodiment of a network configured according to the above described system implementations.

Referring now to FIG. 31, there is illustrated a optical fiber network configuration rather than the wireless configuration illustrated in FIG. 30. Access is provided via DSL and GFAST 3102 and through PONs (passive optical networks), OLT (optical line termination) and MACs (media access controllers) 3104. These and other functionalities are implemented on various commodity servers 3106. Intercommunication between the servers and other components are provided to a leaf spine fabric 3108. Connections to various devices are provided through a fiber switch 3110 that utilizes ONOS implementing open flow, SNMP and REST/NETCONF. The fiber switch 3110 operate through ROADM (reconfigurable optical add-drop multiplexer) 3112, transponders 3114 and muxponders 3116 to provide connections to Metro and two spine switches.

Figure 32:
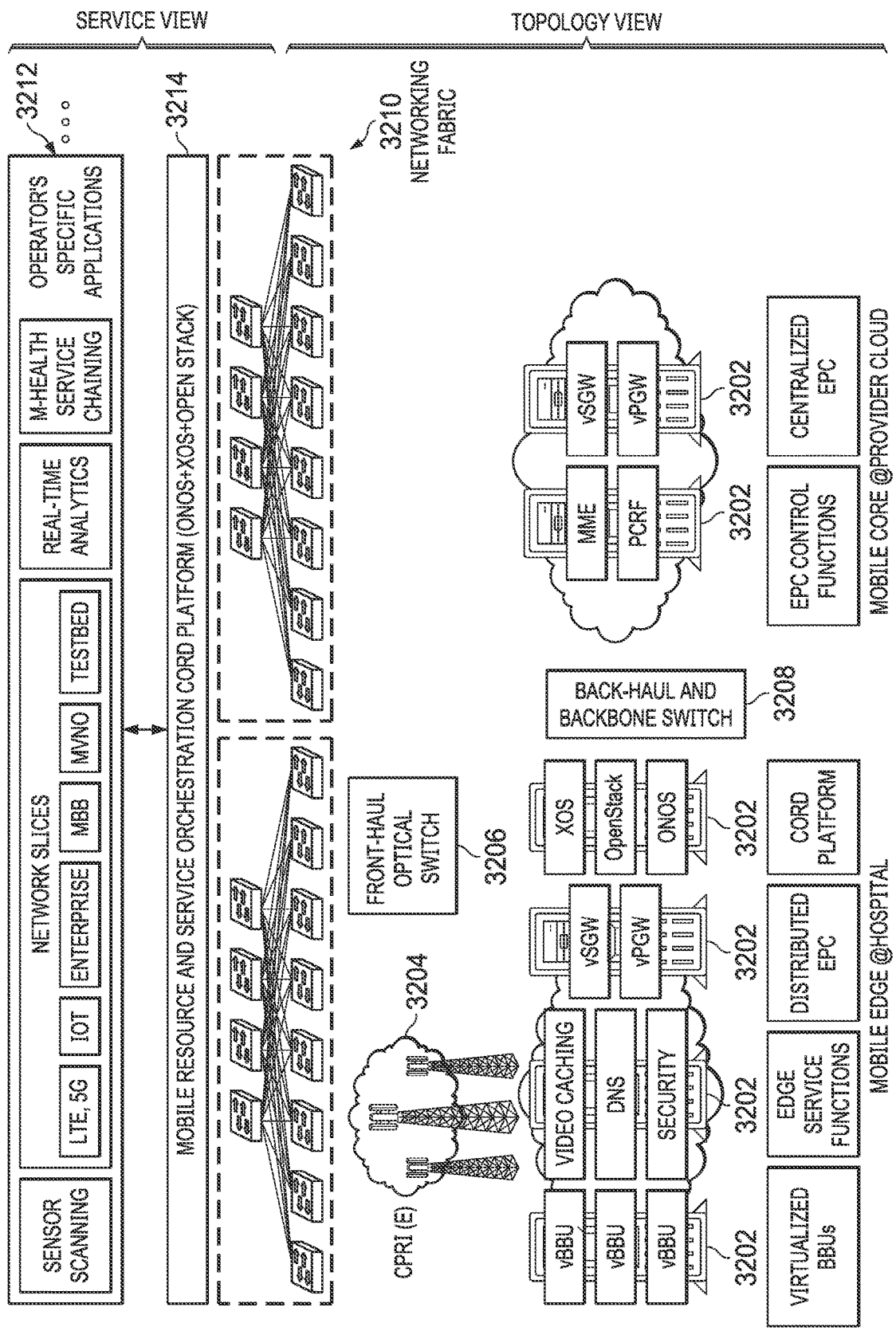
FIG. 32 illustrates a network configuration implemented using commodity servers, massive MIMO antenna configurations and mobile edge computing.

Referring now to FIG. 32, there is illustrated a further network configuration in which various network functionalities are implemented within commodity servers 3202 access is provided through various MIMO antenna configurations 3204 that can provide interconnection to the mobile edge network functionalities on the commodity servers 3202 through front haul optical switches 3206 further connections are provided to the core network through backhaul and back switches 3208. The network fabric 3210 provides for connections to various operator specific applications enabling configuration of the network. Operator specific applications 3212 such a sensor scanning, network slices, LTE, 5G, Internet of things enterprise, MBB and VNO, testbed, real-time analytics and service chaining can provide different functionalities. The operator specific applications 3212 utilize mobile resource and service orchestration CORD platform 3214 that implements ONOS, XOS and Open Stack to provide interaction with the network fabric 3210.

A network is optimized using the above described functionalities. The optimization process is described hereinbelow and may provide high availability, scalability and performance. The network can provide strong abstractions and complicity along with protocol and device behavior independence. This allows for the separation of concerns and modularity.

Various optimization techniques may be utilized. An effective hybrid technique may be used for optimizing multimodal functions in large scale global optimization (LSGO) that will pair the first search space exploration performed initially by standard techniques with more efficient local search techniques. Large scale global optimization (LSGO) is as important technique in large scale traffic networks. As dimensionality increases, the performance of most optimization algorithms quickly goes down. There are two major reasons for this decrease in performance. These are an increase of the complexity and an exponential increase of the search space volume. Due to the increase in complexity, unimodal functions may become multimodal in large dimensions. Due to the exponential increase of the search space volume, optimization algorithms need to increase their efficiency when exploring large search spaces. The efficiency can be measure by the number of function evaluations required to converge to a given optimum. In practice, many large-scale problems are multimodal.

In addition to the exponential increase in the number of candidate solutions, the cost of converging to any local optimum also increases. In high dimensional search spaces, we must focus almost exclusively on gradient exploitation in order to guarantee convergence to any local optima. However, disregarding exploration may lead to poor results in multimodal problems. In multimodal problems, it is critical to explore the search space to find the most promising regions before converging toward a local optima. Even in LSGO some exploration is necessary to achieve good performance on multimodal problems. There is a need to focus on minimum Population Search. The key idea behind the approach is to focus on multi-modal functions and to consider from the beginning the issues when scaling to large scale global optimization. This is done via an efficient use of function evaluations and an unbiased exploration.

In the current approach, search techniques focus more and more on gradient exploitation as dimensionality increases.

So the primary focus is on hybrid techniques which will pair the full search space exploration performed initially by standard techniques with more efficient local search techniques. Therefore, an effective hybrid technique is used for optimizing multimodal functions in LSGO.

Minimum Population Search focuses on multi-modal functions. Originally the ideas were developed for two dimensional problems, later generalized for standard dimensions and scaled towards large scale problems. Standard techniques perform a methodical and unbiased exploration based on the Threshold Convergence (TC) technique. Threshold Convergence is designed to avoid a biased exploration by preventing global and local search steps from happening at the same time. This is achieved by fixing a minimum search step (threshold) which decays as the search progresses. Convergence is thus "held" back until the last stages of the search process.

An iterative optimization procedures built around the concept of self-adaptation called Covariance Matrix Adaptation (CMA) with ($\mu$, $\Lambda$) selection considers the best $\mu$ solutions out of a population with $\Lambda$ solutions for recombination. It is an iterative optimization procedures built around the concept of self-adaptation. The parameters of the search strategy evolve together with the solutions. CMA is an evolution strategy with ($\mu$, $\Lambda$) selection considers the best $\mu$ solutions out of a population with $\Lambda$ solutions for recombination. Recombination operators then create a (single) parent representation from the $\mu$ selected solutions, and $\Lambda$ new children are produced through the use of a probabilistic mutation distribution. CMA-ES (Evolutionary Strategy) uses parameterized multivariate normal distribution for the representation of the mutation distribution.

A hybrid method is used for the optimization of multi-modal problems by identifying promising attraction basins and finding the local optima in these basins. The optimization of multi-modal problems involves two tasks including the identifying promising attraction basins and finding the local optima in these basins. To effectively perform each of these tasks, different search strategies may be used. The hybrid technique of standard MPS takes care of this issue by assigning a different heuristics to each task. MPS's ability to efficiently explore the search space is used during the early stages to identify promising attraction basins.

It will be appreciated by those skilled in the art having the benefit of this disclosure that this SDR-based massive MIMO with the-brand cloud architecture and SDN-based network slicing network optimization process provides an improved technique for implementing a flexible network that may respond to network needs. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for controlling data transmission within a telecommunications network comprising:
    providing interconnection to at least one core network;
    providing interconnection to at least one user device via a base station;
    defining a configurable network interconnecting the at least one core network and the base station;
    selecting a first network slice responsive to use of the configurable network by a first application;
    selecting a second network slice responsive to use of the configurable network by a second application; and
    providing data transmission between the core network and the base station over the configurable network based on the selected first or second network slice.

2. The method of claim 1, wherein the step of providing further comprises providing a data center based cloud architecture to support the first network slice when the first application is selected and the second network slice when the second application is selected.

3. The method of claim 1 further comprising implementing a radio access network (RAN) that has a first configuration responsive to use of the first application by the configurable network and a second configuration responsive to use of the second application by the configurable network.

4. The method of claim 3, wherein the step of implementing further comprises implementing the radio access network using cloud RAN and RAN slicing to implement the first configuration and the second configuration.

5. The method of claim 3, wherein the step of implementing further comprises implementing the first configuration and the second configuration uses licensed bands, shared bands and unlicensed bands.

6. The method of claim 1, wherein the first and the second applications comprise at least one of enhanced mobile broadband, ultra-reliable low latency communications, and massive MIMO type communications.

7. The method of claim 1, wherein the step of defining further comprises implementing software defined radio based coordinated multipoint massive MIMO.

8. The method of claim 1, wherein the step of providing further comprises implementing software defined networking and network function virtualization.

9. The method of claim 1 further comprising generating a series of specific data forwarding paths based on network topology and service requirements to implement network optimization using a software defined controller.

10. The method of claim 1, wherein the step of providing further comprises implementing the configurable network using open source software.

11. The method of claim 1, wherein the step of providing further comprises implementing a radio access network (RAN) that has a first configuration responsive to use of the first application by the configurable network and a second configuration responsive to use of the second application by the configurable network.

* * * * *